United States Patent [19]
Linford

[11] Patent Number: 5,687,259
[45] Date of Patent: Nov. 11, 1997

[54] AESTHETIC IMAGING SYSTEM

[75] Inventor: Ray A. Linford, Kirkland, Wash.

[73] Assignee: Virtual Eyes, Incorporated, Kirkland, Wash.

[21] Appl. No.: 406,201

[22] Filed: Mar. 17, 1995

[51] Int. Cl.$^6$ .................................................. G06K 9/32
[52] U.S. Cl. ........................ 382/294; 395/135; 434/262
[58] Field of Search .................... 382/254, 284, 382/285, 293, 294, 188, 189, 135; 348/64, 95; 395/135

[56] References Cited

U.S. PATENT DOCUMENTS

| | | | |
|---|---|---|---|
| 3,898,617 | 8/1975 | Kashioka et al. | |
| 4,434,467 | 2/1984 | Scott | 364/400 |
| 4,635,293 | 1/1987 | Watanabe | |
| 4,641,352 | 2/1987 | Fenster et al. | |
| 4,672,676 | 6/1987 | Linger | |
| 4,918,611 | 4/1990 | Shyu et al. | |
| 4,965,841 | 10/1990 | Kaneko et al. | |
| 4,975,960 | 12/1990 | Petajan | |
| 5,060,171 | 10/1991 | Steir et al. | 395/135 |
| 5,280,570 | 1/1994 | Jordan | 395/135 |
| 5,299,270 | 3/1994 | Tokura | |
| 5,337,231 | 8/1994 | Nowak et al. | |
| 5,375,195 | 12/1994 | Johnston | 395/135 |
| 5,403,191 | 4/1995 | Tuason | 434/262 |
| 5,404,426 | 4/1995 | Usami et al. | 395/135 |
| 5,515,447 | 5/1996 | Zheng et al. | |
| 5,532,839 | 7/1996 | Beikirch et al. | 358/401 |
| 5,537,662 | 7/1996 | Sato et al. | 395/135 |

OTHER PUBLICATIONS

Snap™ Manual, Envision International, Inc., 1992, pp. i–v, 1–47.

Update to Tips to User's Guide, Tips™ Imaging Software for the Targa™ Videographics Adapter, Model 16, 24 and 32, Truevision, Inc., Indianapolis, Indiana, 1987, pp. 2–1 through 2–42 and 3–1 through 3–136.

Primary Examiner—Michael T. Razavi
Assistant Examiner—Jayanti K. Patel
Attorney, Agent, or Firm—Christensen O'Connor Johnson & Kindness PLLC

[57] ABSTRACT

Disclosed is an aesthetic imaging system (20) for use in editing digital images. The aesthetic imaging system includes an imaging program(21) that runs on a personal computer (28) having an image capture board (30), a monitor (32), a video source (34) for providing digital images to be edited by the aesthetic imaging system, and a pen and tablet 38 for use in editing the images. The imaging program includes a unique combination draw tool that includes a freehand draw mode, a curve mode and an undo mode that are available without cycling through menus. The combination draw tool may be used with any of the draw tools. Another feature of the imaging program is autoblend, a rectangular user interface that is invoked by each of the shape tools. The autoblend interface simplifies editing when using shape tools by consolidating the move, paste and blend, and paste without blending commands into a single, convenient interface.

11 Claims, 25 Drawing Sheets

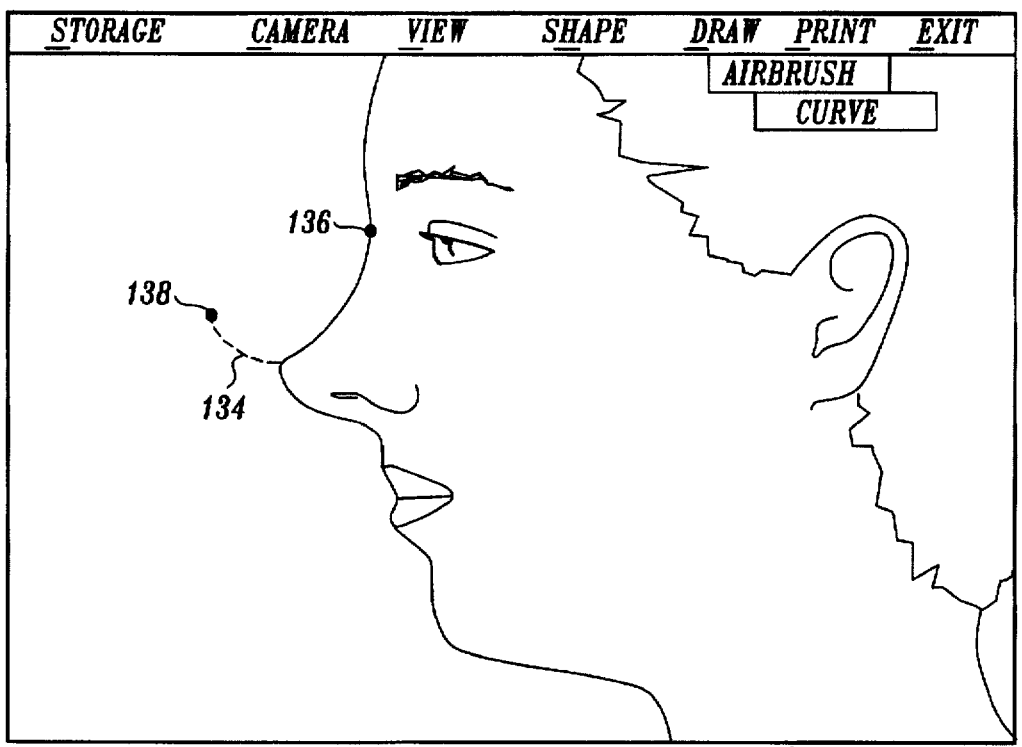
( PRIOR ART ) *Fig. 7A.*
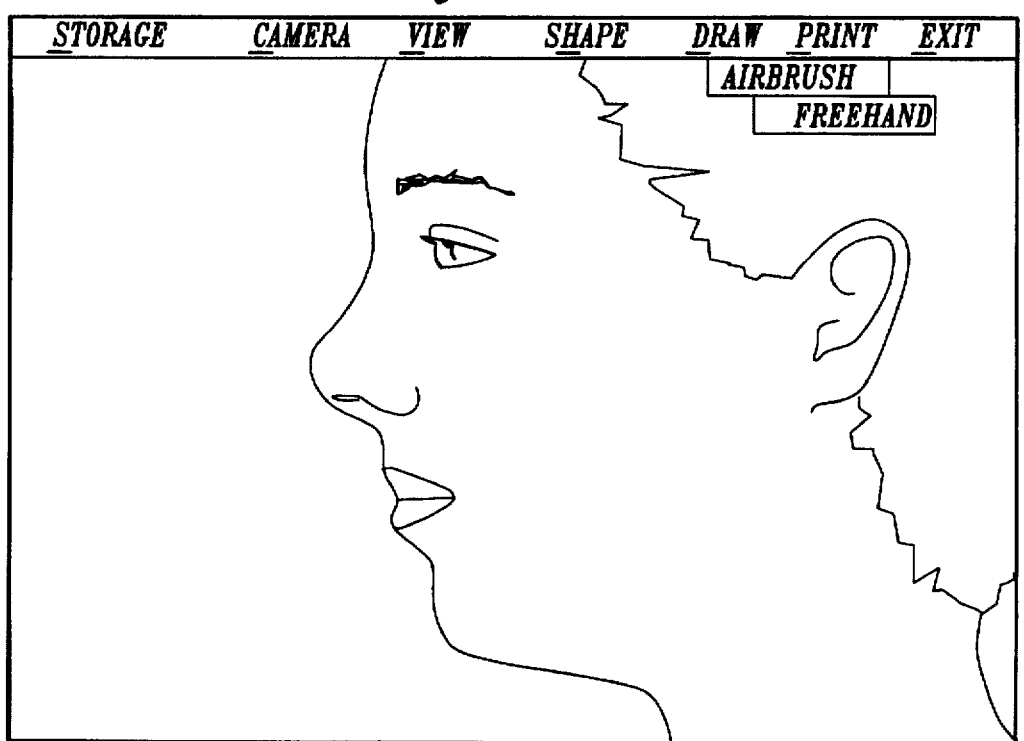
( PRIOR ART ) *Fig. 7B.*

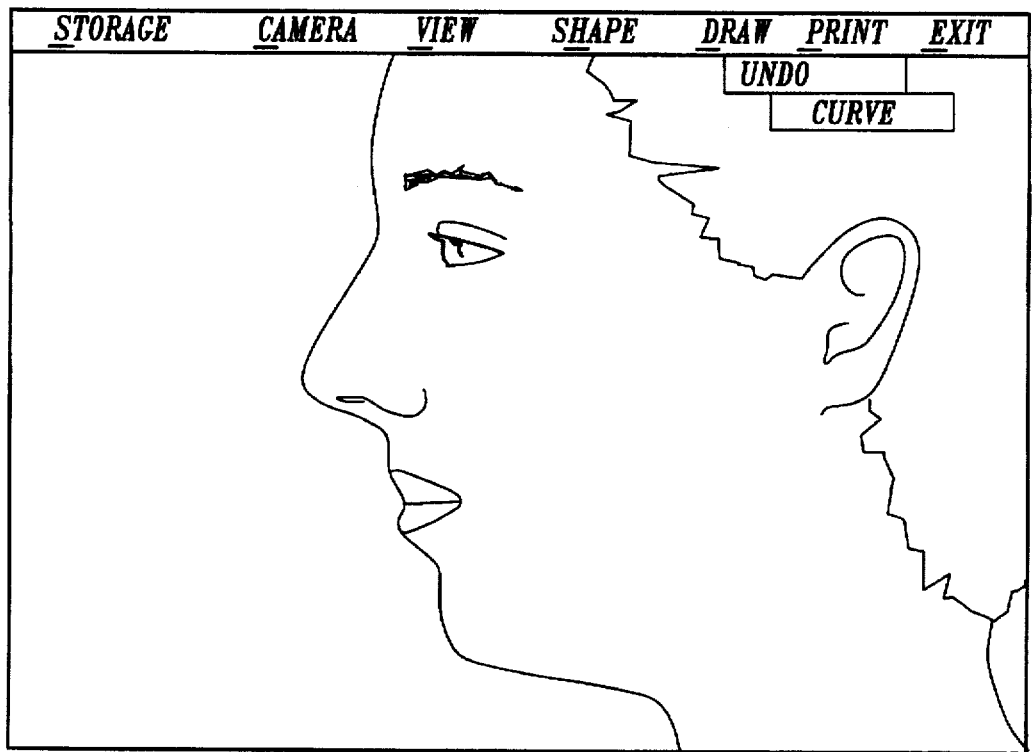
( PRIOR ART ) *Fig. 7C.*
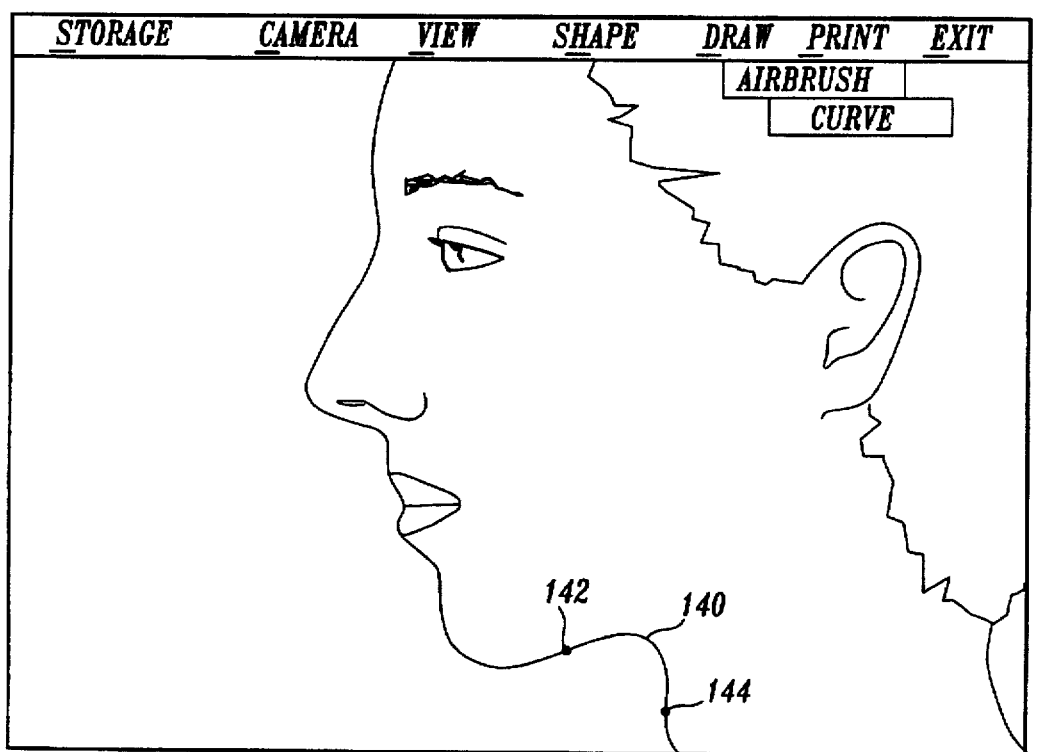
( PRIOR ART ) *Fig. 7D.*

AESTHETIC IMAGING SYSTEM

FIELD OF THE INVENTION

This invention generally relates to computer imaging programs and, more specifically, to a method and apparatus for manipulating digital photographs.

BACKGROUND OF THE INVENTION

The digital age continues to present additional opportunities for visual communication using computers. As an example, digital photographs are routinely being manipulated to produce a desired effect or result in the magazine and film-making industries. In the medical field, computer-based imaging has and continues to gain acceptance in a clinical setting as a viable communications tool between plastic or "cosmetic" surgeons and potential patients.

People are with increasing frequency consulting physicians about cosmetic surgery. While in many cases the patients considering cosmetic surgery have an impressive understanding of the procedures available and medical terms used to describe these procedures, it is apparent that the slightest miscommunication may result in dire consequences. This has promoted the use of computer imaging to facilitate communication between the physician and prospective patient. Specifically, high-end aesthetic imaging systems allow a physician to take pre-operative digital images of the patient, e.g., including profile and frontal views. The images are stored in memory in the computer where they can then be edited. Using feedback from the patient, the edited images are useful in fully understanding the procedures desired. The visual support provided by a computer-based imaging system is extremely valuable on both sides. A cosmetic surgeon can more readily understand what patients hope to achieve by a cosmetic surgical procedure; and patients can view a detailed visual representation of predicted results, including both the benefits and limitations of the procedure.

Existing aesthetic imaging systems typically use a number of tools to allow a physician to manipulate a pre-operative image of a patient to illustrate an intended post-operative result. The most commonly used tools include:

Among others, a disadvantage of existing aesthetic imaging programs is that a physician or facilitator in a pre-operative consultation typically must go back and forth through many windows-based menus in order to edit an image. Cycling between the various menus to invoke the tools necessary for a consultation is disadvantageous in that it is time consuming. For example, some physicians schedule a follow-up visits for patients to allow the physician time to edit the images. More important, however, is that the process is distracting to the patient and tends to make the pre-operative consultation all the more mystifying. As a result of the disadvantages associated with prior art systems, some patients lose interest or become frustrated with the interview, both of which may reflect back on the physician.

An improved aesthetic imaging system in which a physician can more easily edit pre-operative images in response to a patient's suggestions and inquiries would be extremely advantageous.

SUMMARY OF THE INVENTION

The invention is an aesthetic imaging system for use in editing digital images. The aesthetic imaging system includes a unique user interface that allows edits to be performed more efficiently and with less confusion to the patient.

In one aspect of the invention, a method of editing a digital image comprised of a plurality of color pixels in an aesthetic imaging system is disclosed. The aesthetic imaging system including a processor, a memory, a monitor, and a pen and cooperating tablet for controlling a cursor displayed on the monitor. The pen has a depressable tip and a side button, each of which include an on status and an off status, wherein the position of the pen tip relative to the tablet determines the position of the cursor on the monitor. The method comprises: (a) evaluating the following variables: (i) the status of the tip of the pen; (ii)the status of the side button on the pen; and (iii) movement of the pen tip relative to the tablet; (b) actuating a freehand drawing mode if a first set of variables are present, wherein movement of the pen relative to the tablet edits pixels that are located at positions corresponding to the position of the cursor; and (c) actuating a curve drawing mode if a second set of variables are present, wherein a line segment is displayed between two endpoints and movement of the pen relative to the tablet stretches the line segment, forming a curve and editing pixels that are located at positions corresponding to the position of the curve.

In another aspect of the invention, method further includes: (a) actuating a freehand undo mode if a third set of variables are present, wherein movement of the pen relative to the tablet restores pixels that are located at positions corresponding to the position of the cursor to their pre-edited color; and (b) actuating a curve undo mode if a fourth set of variables are present, wherein a line segment is displayed between two endpoints and movement of the pen relative to the tablet stretches the line segment, forming a curve and restoring pixels that are located at positions corresponding to the position of the curve to their pre-edited color.

In other aspects of the invention, the freehand draw mode is actuated if the tip of the pen is depressed and pressure is maintained while the tip is moved a predetermined distance. In another aspect, the curve draw mode is actuated if the tip of the pen is depressed and released within a predetermined distance.

In a further aspect of the invention, the curve draw mode is actuated by: (a) establishing a first endpoint at the position of the pen when the second set of variables are present; and (b) monitoring the status of the tip of the pen and establishing a second endpoint at the position of the pen if the tip is toggled from an off sate to an on state.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7A-7E are pictorial representations of editing an image using a prior art imaging program;

DESCRIPTION OF THE PREFERRED EMBODIMENTS

Figure 1:
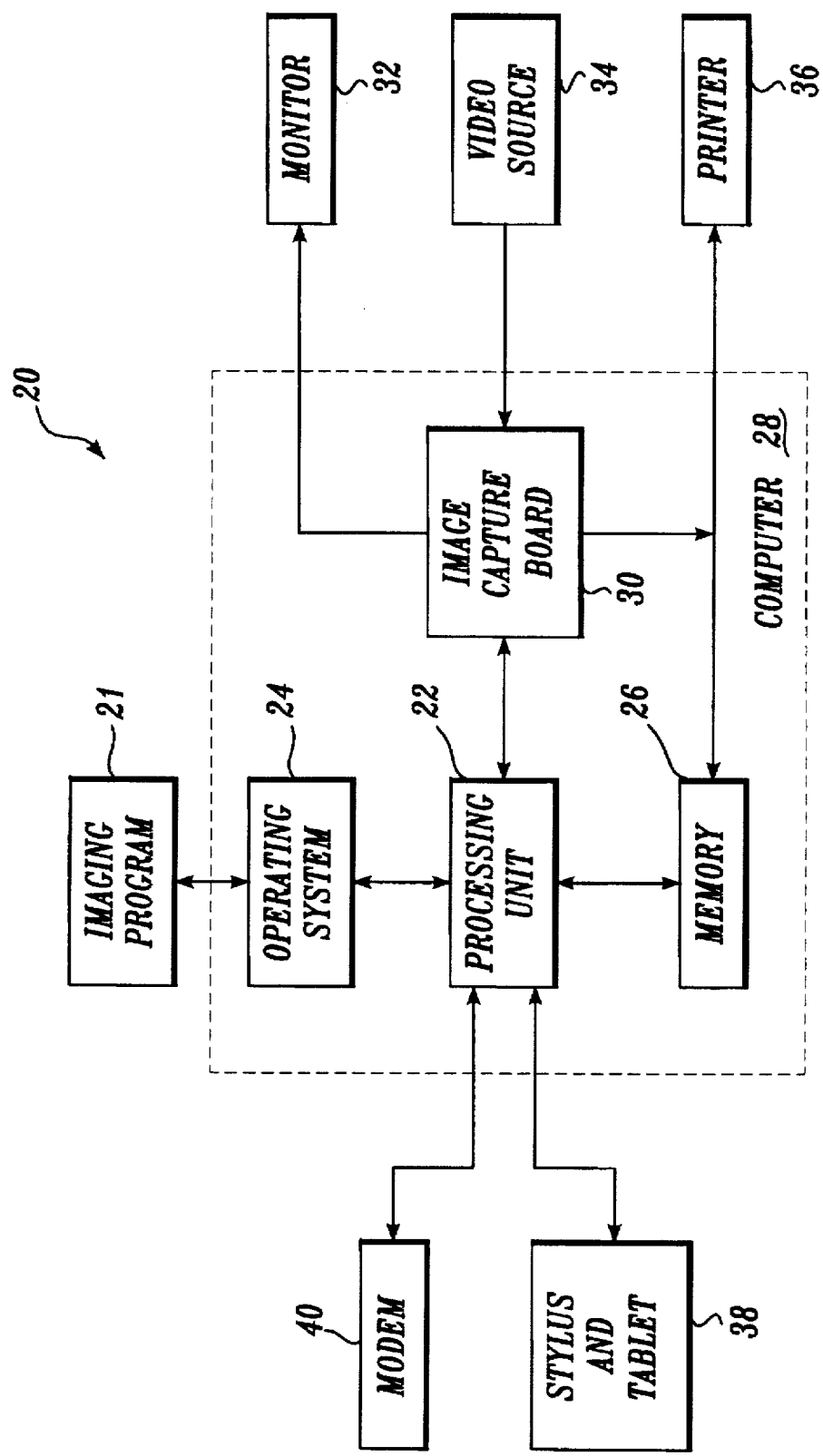
FIG. 1 is a block diagram of an aesthetic imaging system in accordance with the invention.

An aesthetic imaging system 20 in accordance with the invention is illustrated in FIG. 1. The aesthetic imaging system 20 includes an imaging program 21 that runs on a processing unit 22 controlled by an operating system 24. A memory 26 is connected to the processing unit and generally comprises, for example, random access memory (RAM), read only memory (ROM), and magnetic storage media such as a hard drive, floppy disk, or magnetic tape. The processing unit and memory are typically housed within a personal computer 28 which may be, for example, a Macintosh™, International Business Machines (IBM™) or IBM-compatible personal computer. When used with IBM and IBM-compatible personal computers, the operating system 24 may be DOS based or may incorporate a windowing environment such as Microsoft Windows™ or OS/2™.

The aesthetic imaging system also includes an image capture board 30 that is coupled to the processing unit 22, a monitor 32, video source 34, and printer 36. The video source, monitor, and printer are coupled to the processing unit 22 through the image capture board 30. The video source may include one or more video cameras, a VCR, a scanner, or similar source for providing digital images to be edited by the aesthetic imaging system. The aesthetic imaging system further includes a pointing device, which is preferably a stylus (pen) and tablet 38, that is connected to the processing unit 22. In addition, the aesthetic imaging system may include a modem 40 to provide on-line capabilities to users of the system, such as technical support and teleconferencing.

Figure 2:
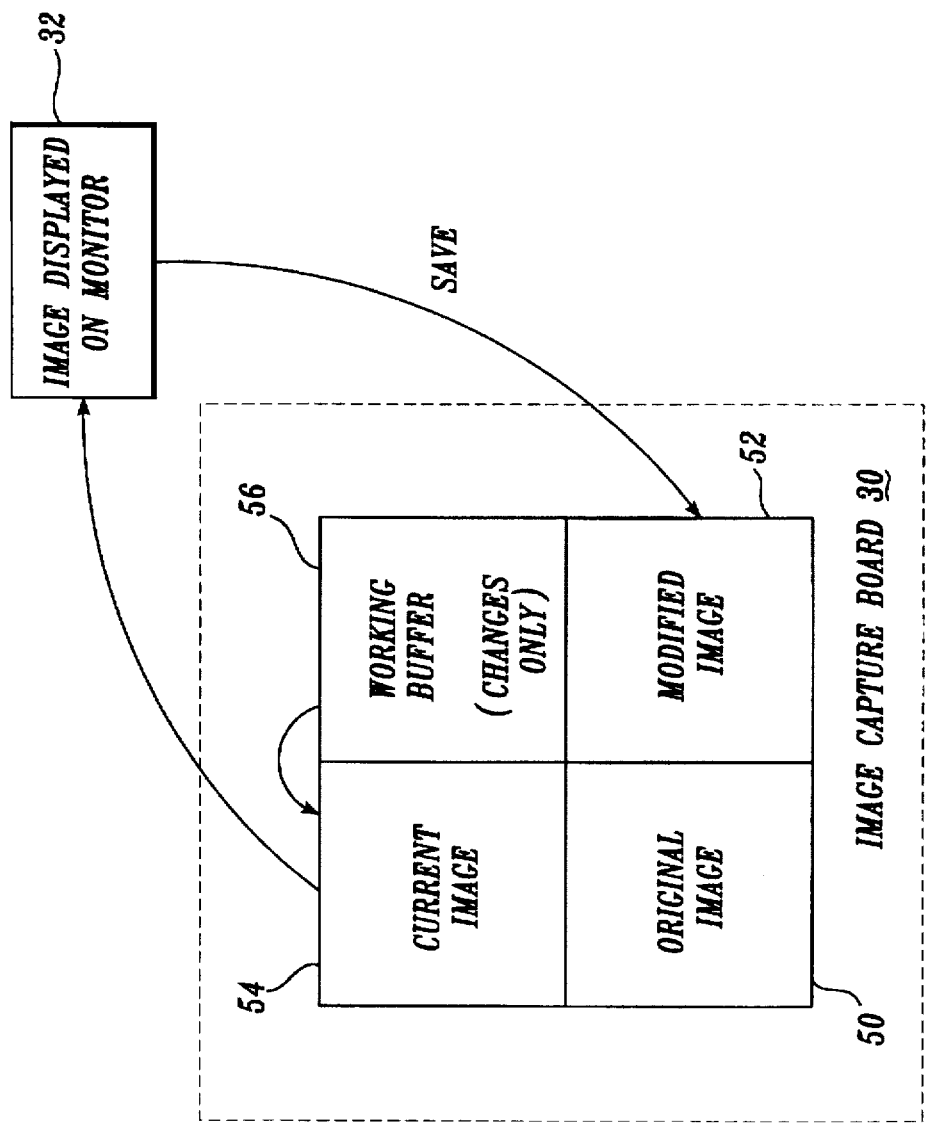
FIG. 2 is a block diagram illustrating various buffers used by the aesthetic imaging system to store and manipulate data.

The image capture board 30 has a plurality of buffers in high-speed memory, e.g., RAM, that are used by the imaging program 21 to provide very fast response times to image edits. With reference to FIG. 2, four buffers are illustrated for use in explaining the operation of the aesthetic imaging system. These include an original image buffer 50, a modified image buffer 52, a current image buffer 54, and a working buffer 56. Suitable image capture boards for use in the aesthetic imaging system include the Targa +64 and Targa 2000 boards, distributed by Truevision, Inc. of Indianapolis, Ind. The buffers are discussed in regard to a single pose only, such as a profile or front view of a person.

The original image buffer 50 contains an unedited digital image, for example, a side profile picture of a potential patient. The modified image buffer 52 contains any edits made to a copy of the original image. The modified image buffer is updated during a save and after each session. The current image buffer 54 contains information identical to the modified image buffer upon beginning a session. Thereafter, edits made to the current image are saved in the working buffer 56 as an overlay to the current image. During a save, the contents of the current image buffer 54 are copied to the modified image buffer 52, and the working buffer 56 is cleared.

Prior to discussing the aesthetic imaging system in further detail, a compendium of terms used in the application may be helpful:

| | |
|---|---|
| Image | A digital photograph or picture of a patient. |
| Stylus | The "pen" that may be used to select menus, modify images, and carry out other commands in the program. The stylus controls the cursor, just as a mouse pointing device does on a personal computer. |
| Tablet, or Pad | The electronic notepad used in conjunction with a stylus. The pen must be held relatively close to the pad in order for the pen to communicate with the tablet. Unlike a mouse, the tablet follows an X/Y grid that matches the monitor, i.e., if the pen is positioned at the top left corner of the tablet, the cursor is displayed at the top left corner on the monitor. |
| Floating | Moving the pen to move the cursor, without actually touching the tablet. |
| Selecting | Selecting (also referred to as "tipping" or "pressing") the tip of the pen briefly onto the tablet. This selects a command or affects the drawing tool, depending on the current procedure being implemented. |
| Cancel | Using the side button on the pen to execute a command. |
| Moving | Pressing the tip of the pen on the tablet, releasing it, then moving it across the tablet. |
| Pressing or Tipping & Dragging | Pressing the tip of the pen, then dragging it across the tablet while maintaining pressure. When using drawing and shaping tools, this turns the cursor into a drawing tool, enabling the user to draw freehand objects or "brush" the image in any manner. |

Figure 3:
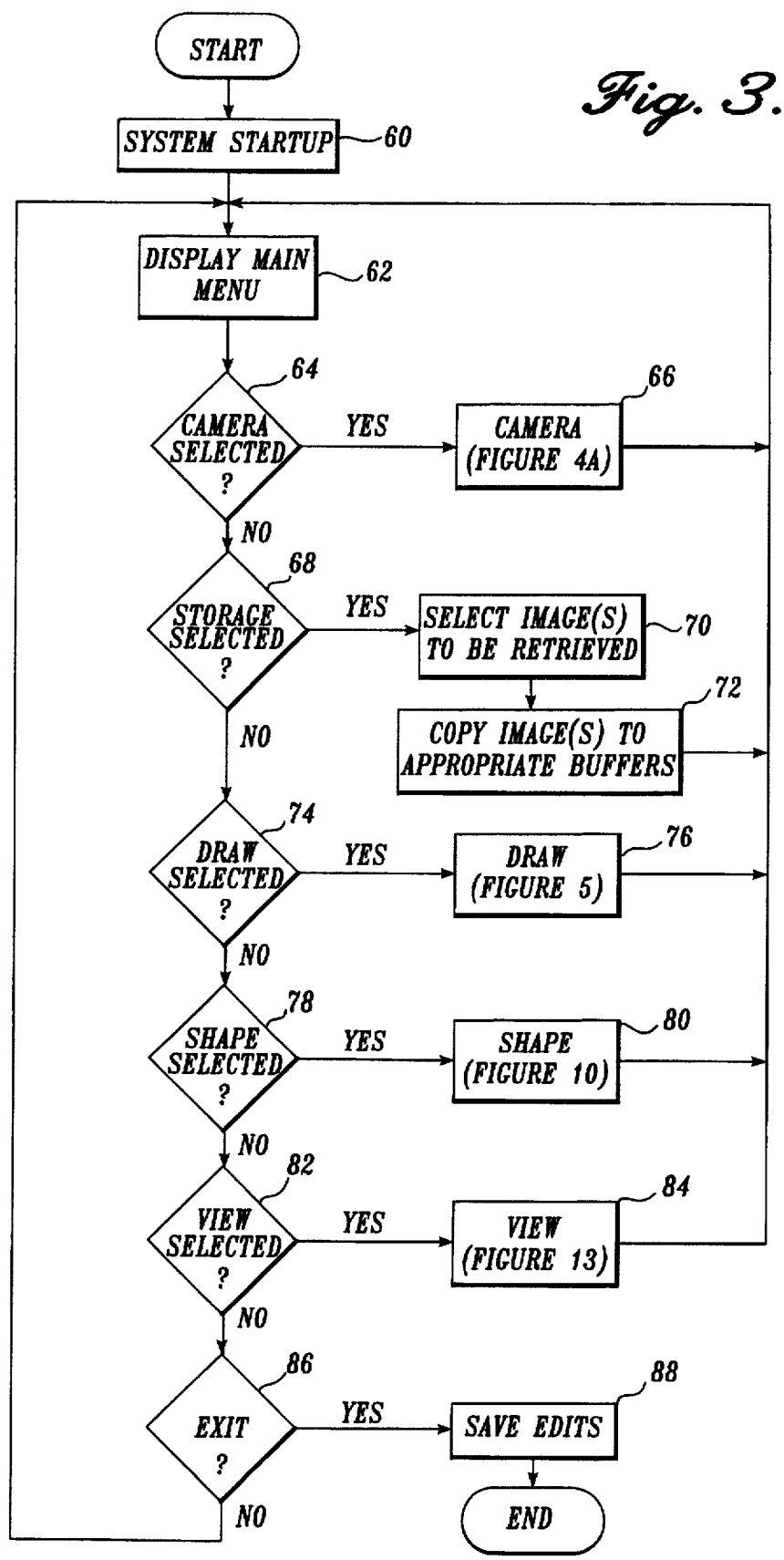
FIG. 3 is a flow chart illustrating an exemplary routine by which digital images may be viewed and edited using the aesthetic imaging system.

FIG. 3 illustrates an exemplary routine for implementing the imaging program 21 in accordance with the invention. At block 60, a system startup is performed wherein the computer looks for peripheral devices that are connected to the aesthetic imaging system, the memory is tested, and any other startup procedures needed to get the system up and running are implemented. At block 62, the imaging program displays a main menu, which provides access to the various features of the imaging program. Specifically, the main menu includes the following options: Storage, Camera, View, Shape, Draw, Print, And Exit. Those options that are pertinent to the invention are described in further detail below.

At block 64, a test is made to determine if the Camera option has been selected from the main menu, indicating that the user wants to take a picture of a patient. If the Camera option has been selected, a routine to implement this command is called at block 66. A suitable subroutine for this task in illustrated in FIG. 4. Upon return from the Camera routine, the program loops to block 62.

If the Camera option was not selected, a test is made at block 68 to determine if the Storage option has been selected for the main menu, indicating that the user wants to load an image (picture) from computer storage, e.g., a hard drive. If the Storage option was selected, the image(s) to be edited or viewed during the current session are selected at block 70.

At block 72, the selected images are copied to the appropriate buffers in the frame grabbing board, as described in FIG. 2 and the accompanying text. For example, if the selected image is an original image that has not yet been edited, the original image will be copied to the original, modified, and current image buffers. If the selected image is an image that has previously been modified, the original image is copied to the original image buffer 50 and the modified image is copied to both the modified and current image buffers 52 and 54. It will be appreciated that the number of images that may be loaded at one time will be limited, in part, by the capacity of the frame grabbing board. The program then loops to block 62.

Figure 5:
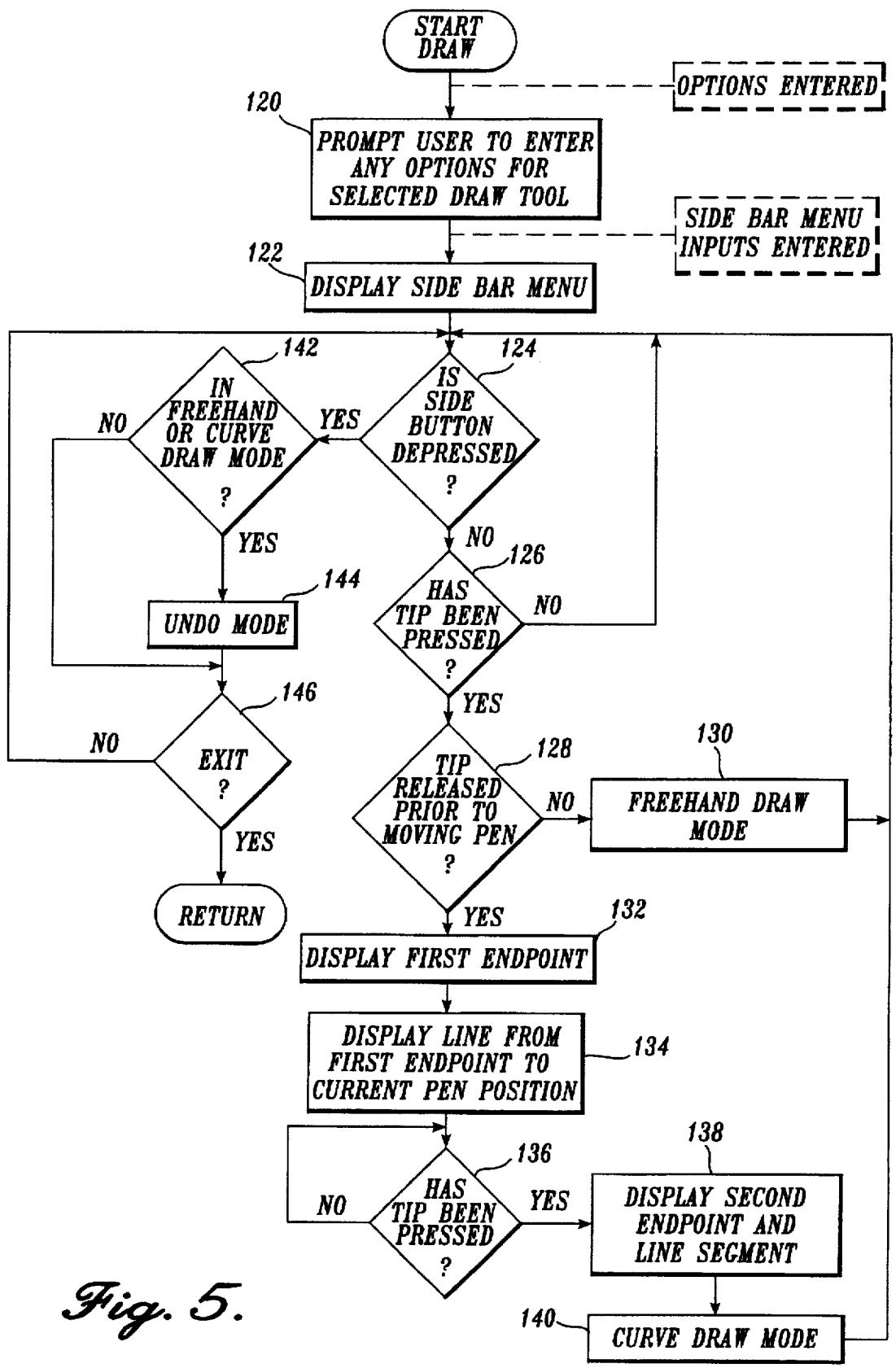
FIG. 5 is a flow diagram of an exemplary routine for implementing a combination tool for use with various drawing (draw) tools in accordance with the invention.

If the Storage option was not selected, a test is made at block 74 to determine if the Draw option has been selected from the main menu. If the Draw option has been selected, a draw tool routine is called at block 76. The program then loops to block 62. A suitable routine for implementing the Draw option is shown in FIG. 5.

Figure 10:
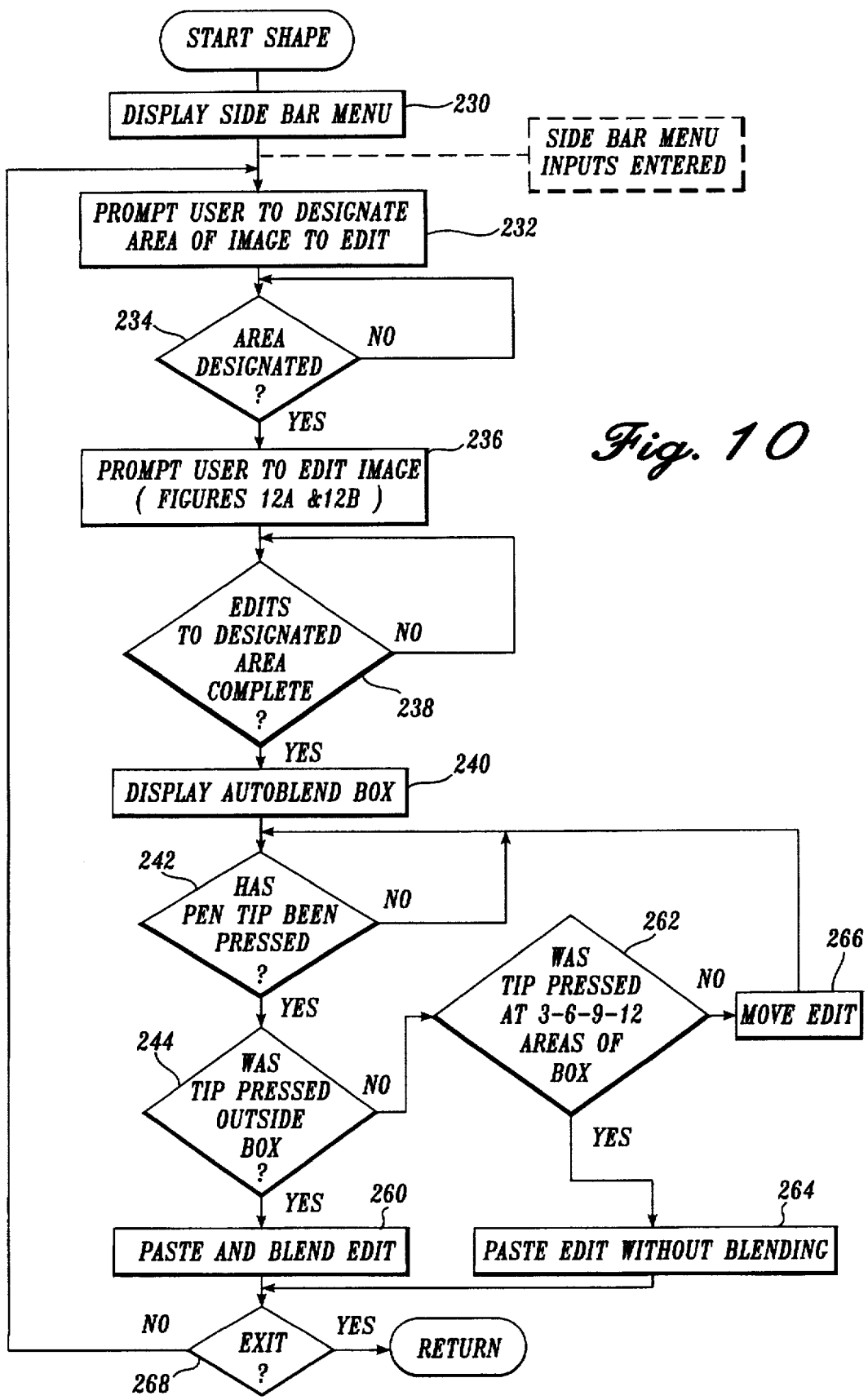
FIG. 10 is a flow chart of an exemplary routine for implementing an autoblend tool in accordance with the invention.

If the Draw option was not selected, a test is made at block 78 to determine if the Shape option has been selected. If the Shape option has been selected, a shape tool routine is invoked at block 82. A suitable routine for implementing the Shape option is shown in FIG. 10. Otherwise, at block 82 a test is made to determine if the View option has been selected.

Figure 13:
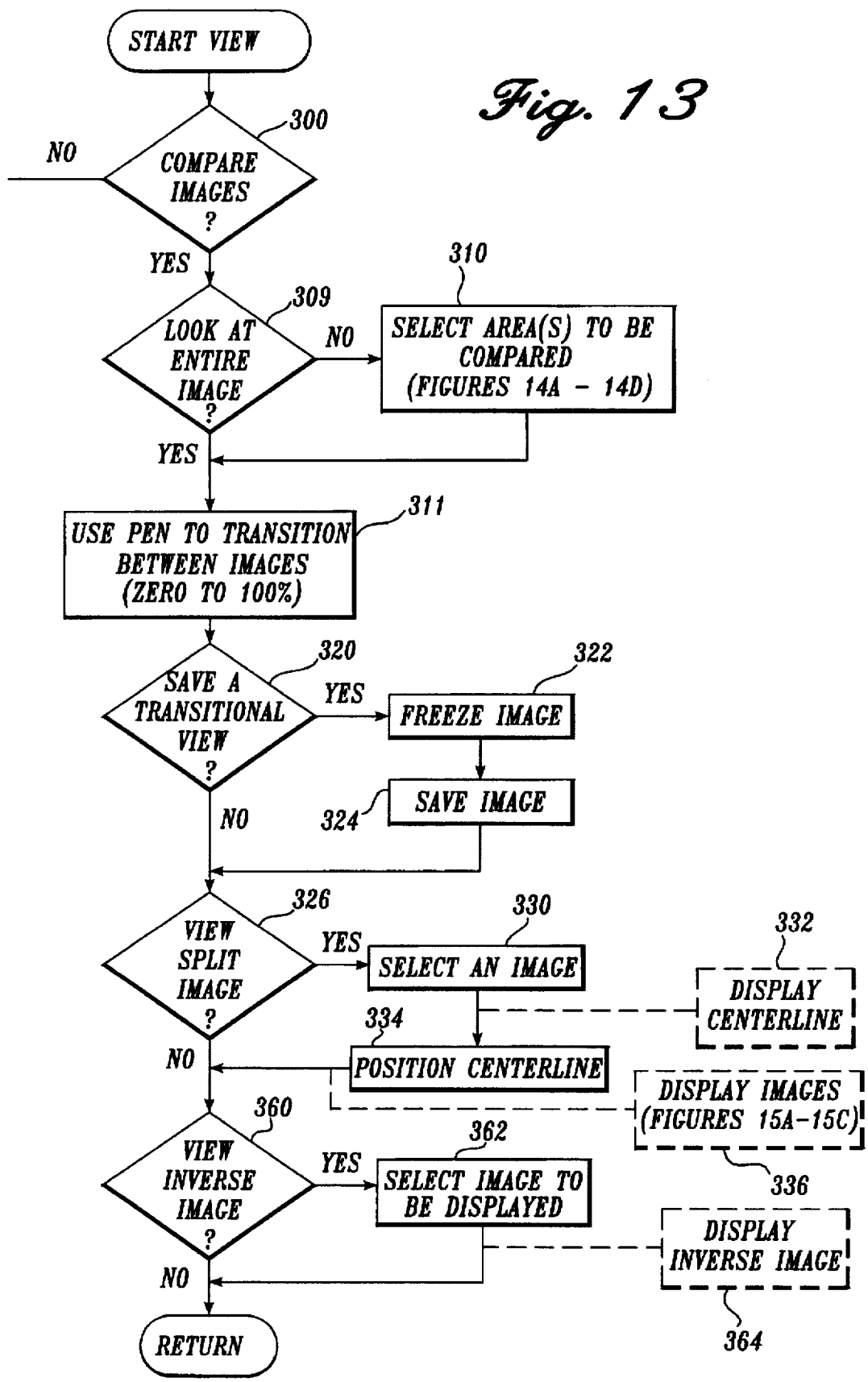
FIG. 13 is a flow chart of an exemplary routine for viewing images in accordance with the invention.

If the View option has been selected, a view subroutine is invoked at block 84. An appropriate routine for the View option is shown in FIG. 13. The program then loops to block 62. At block 86 a test is made to determine whether the Exit option has been selected from the main menu. If not, the program loops to block 62. Otherwise, any edits to the image are saved at block 88. At this point in the program, the image in the current image buffer 54 is saved to the modified image buffer 52, and the working buffer 56 is cleared. The program then terminates.

Taking Pictures of a Patient Using an Inverse Image

Figure 4A:
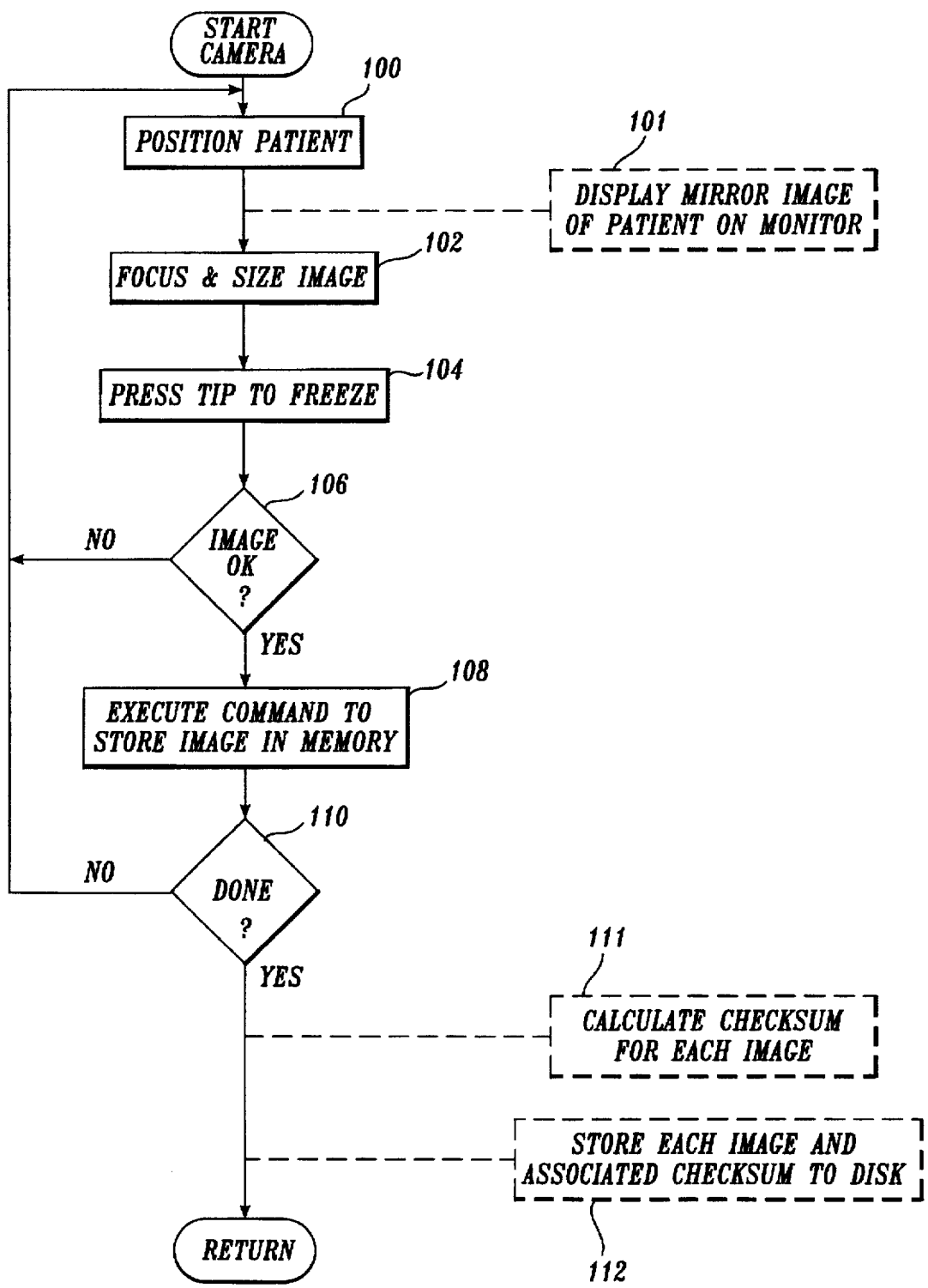
FIG. 4A is a flow chart of an exemplary routine for photographing patients in accordance with the invention.

FIG. 4A illustrates an exemplary user interface that utilizes a video camera for acquiring a digital image of a patient. It is noted a scanner or other input device may also be used to input an image into the aesthetic imaging system. In FIG. 4A, the solid blocks indicate user interface options presented to the user by the aesthetic imaging system and the dashed blocks represent system responses to the decisions made. At block 100, a patient is positioned in front of the video camera. In a preferred embodiment of the aesthetic imaging system, an inverse or "mirror" image of the patient's image will be displayed on the monitor, as indicated at block 101. The inverse image is computed using data from the original image, and is representative of how patients see themselves day to day when looking into a mirror. More specifically, digital images are comprised of pixels or picture elements. It is known to those skilled in the art how digital image pixels may be manipulated to create an image that is the inverse of the original.

Displaying an inverse image of a patient is advantageous when taking pre- and post-surgical pictures of patients because it allows patients to more easily center or otherwise position themselves on the monitor. Without the pixel manipulation, the input from a camera or other digital device may create confusion when positioning a patient. Under normal viewing, if a patient appears left of center in the monitor, they are in reality too far to the right. In this instance, a typical patient's reaction is to move even further to the right. With a mirror image displayed, the tendency of most patients is to naturally adjust to the desired position.

The displaying of a mirror image is particularly important when taking post-surgical pictures. In post-surgical pictures, it is advantageous to have the patient in exactly the position they were in when taking the pre-surgical picture. For post-surgical pictures, the aesthetic imaging system will preferably display a translucent inverse image of the pre-surgical picture on the monitor, and then overlay an inverse image of the picture currently being taken. Patients can thus easily align themselves with their former picture to achieve very similar before and after pictures.

Upon establishing a desired position for the patient, the image is focused and sized at block 102 by using the aesthetic imaging system to adjust the electronic controls on the video camera. After any adjustments have been made to the camera, at block 104 the tip of the pen is pressed anywhere on the tablet to freeze the digital image onto the monitor. At block 106, the user makes a determination if the image currently displayed on the monitor is acceptable. If the image is not acceptable, the routine loops to block 100. If the image is acceptable, an appropriate command is entered at block 108 and the image is stored in nonvolatile memory for future viewing.

At block 110, a test is made to determine if an exit or other similar command has been entered by the user, i.e., if any more pictures are to be taken. If additional pictures are to be taken, the program loops to block 100. Otherwise, at block 111 a checksum value (described below) is calculated by the imaging program for each (original) image that has been stored. At block 112, the imaging program stores each image and its associated checksum value. The routine then returns to block 68 of FIG. 3.

Determining Authenticity Using Checksum Values

The checksum value is an addendum to an original stored image that is used to determine its authenticity when the image is subsequently displayed or printed. Those skilled in the art will recognize that there are a number of methods of implementing such a checksum procedure. For example, one checksum computation is to add up the grayscale values for one of the colors, i.e., red, green, or blue, for each pixel comprising the image. Assuming a screen of 640 by 480 pixels and 256 colors per pixel, the checksum values would range from 0 to (640)(480)(255). When an image is recalled for display or to be printed, the checksum value is recalculated. If the image has not been modified, the newly calculated checksum value will be equivalent to the addendum value, and the image is certified as being unaltered. If the image has been modified, the checksum values will vary, indicating the image has been modified. In this instance, an indication of the fact that the image has been modified may be displayed or printed with the image, if desired.

The authentication of an original image using a checksum value is ideal for situations in which physicians display before and after pictures of a patient who has undergone cosmetic surgery. In some instances, viewers are skeptical as to whether an "after" image is really representative of a patient's appearance after surgery. This is in reaction to beliefs that post-surgical images have been altered to make the patients look better. For example, there may be temptation to slightly fade wrinkles or otherwise edit features that the physician was attempting to address in a surgery. Using the described checksum feature, the post-surgery image can be verified as an authentic, unaltered image based upon the addendum value, and the veracity of the image is not questioned. This is beneficial to physicians when illustrating post-surgical results during lectures or in other teaching situations.

Figure 4B:
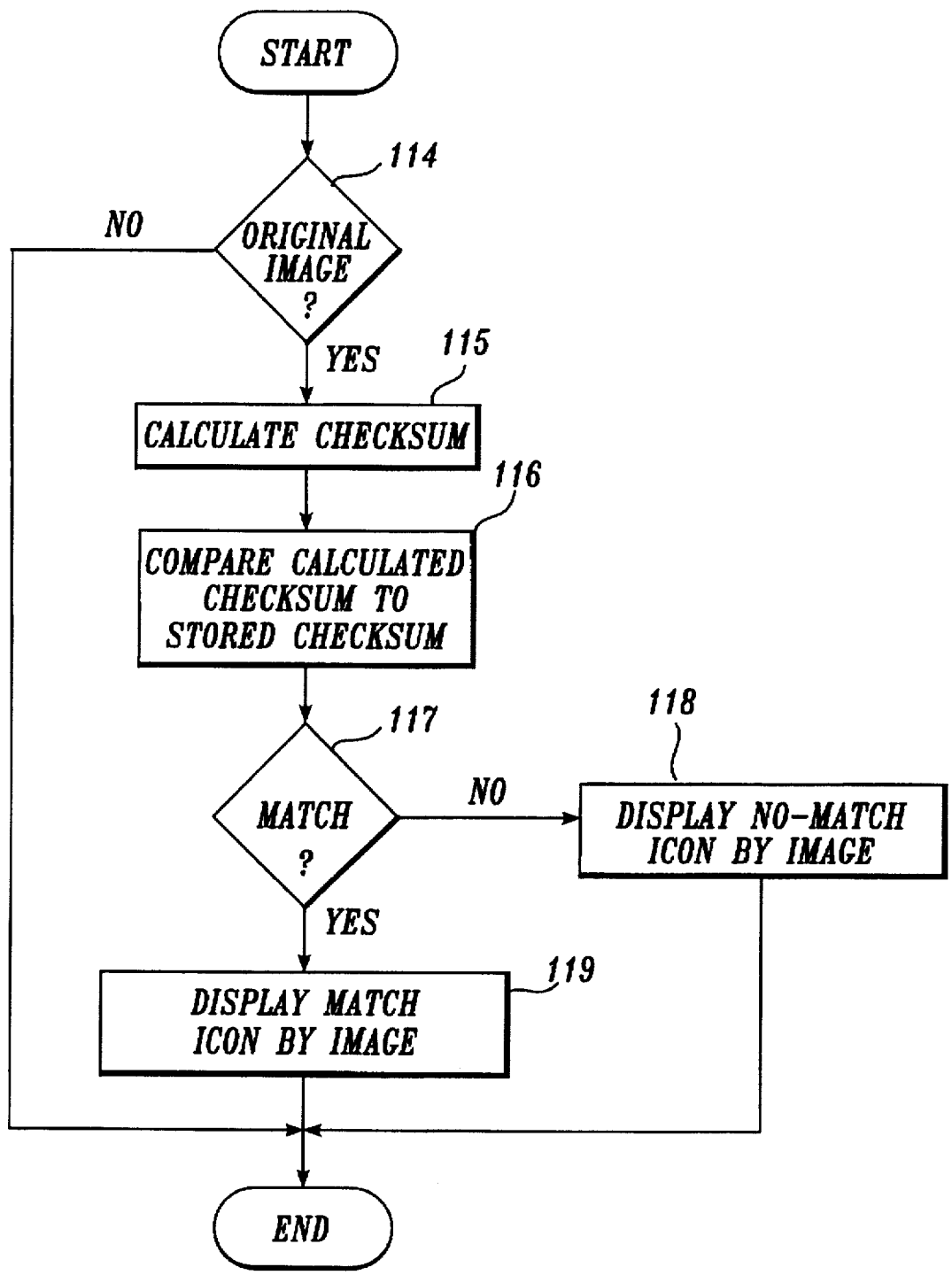
FIG. 4B is a flow chart of an exemplary routine for calculating a checksum value and comparing the calculated value to a previously stored value to determine if an image has been altered.

FIG. 4B illustrates an exemplary routine for determining whether or not an original image, i.e., pre- or post-surgical image, has been altered in accordance with the invention. This routine may be invoked whenever a pre- or post-surgical image is displayed on a monitor or printed on a page. At block 114, a test is made to determine whether the image to be displayed is portrayed as an "original image" that was not modified, e.g., a before or after picture. If the image is supposed to be an original image, a current checksum value for the image is calculated at block 115. At block 116, the calculated checksum value for the image is compared to the checksum that was stored when the image was acquired by the aesthetic imaging system, e.g., when the picture was taken.

At block 117, the calculated checksum value is compared to the stored checksum value to see if they are equivalent. If the two values are not equivalent, at block 118 an icon is added to the image, e.g., displayed or printed along with the image, indicating that the image has been altered. If the checksum values are equivalent, an icon is added to the image at block 119 verifying the authenticity of the image. Once either icon has been added to the image, or if the image being printed or displayed is not an original image, the program terminates. As will be appreciated, the same checksum computational method must be used on each image, i.e., when an original image is acquired and when an image is to be displayed, or the comparison will be meaningless.

The editing aspects of the invention are now described.

Editing Using Draw Tools

A disadvantage of prior art aesthetic imaging systems is that a physician or facilitator may have to cycle back and forth between several menus in order to properly edit an image. In an effort to minimize the number of menus required, the imaging program includes a unique combination draw (CD) feature that generally works with all of the drawing tools. The CD feature allows a user to freehand draw, use curves to edit an image, as well as undo using either freehand or curves, without having to invoke a separate menu for each item.

The following describes an interface for the CD feature as implemented in an embodiment of the invention. For purposes of this discussion, it will be assumed that the airbrush tool is selected as the drawing tool, although it is to be understood that the CD tool generally applies to all of the drawing tools. Upon selection of the airbrush draw tool, the aesthetic imaging system prompts the user to choose a color from a color palette that appears on the monitor. A color is selected using the pen. After selecting a color, a side bar menu is displayed. The user may select from a number of options on the side bar, including brush size and intensity, or select away from the side bar menu to remove the menu from the screen. In the latter case, the system defaults are used.

To freehand draw, the user presses on the tablet with the pen tip and continues pressure while moving or "rubbing" the pen on the tablet. At this point the chosen color is written onto the image at the location on the monitor that corresponds to the pen location. Pressing the side bar while repeating the motion will allow the user to selectively remove any edits to the image using a freehand motion.

To draw a curve, the user must set a first anchor point by selecting with the pen. Thereafter, as the user moves or "floats" the pen across the tablet, a green line will extend from the first anchor point to the current position of the pen. In a desired location, a second anchor point is set by selecting with the pen. Once both anchor points have been established, the green line appears on the monitor as a segment between the two anchor points. To create a curve, the user floats the pen across the tablet. The system will display a curved line bending and moving with the movement of the pen. The pen movement (top to bottom, or side to side) determines the arc of the curve. As the curve moves across the image, the image is edited in accordance with the selected draw tool and draw tool options. With the airbrush example, the system displays the curved line repeating itself with the chosen color. Pressing the side bar while repeating the motion will allow selective removal of any edits to the image using a curve established between the anchor points.

FIG. 5 illustrates an exemplary routine for implementing the CD feature of the imaging program. In one embodiment of the invention, the draw tool group includes: Airbrush, Tint, Texture, Blend, Undo, and Contour. Once a draw tool is selected from the main menu at block 74 of FIG. 3, the routine of FIG. 5 begins and selections must be made, or default selections confirmed, for the selected draw tool. Specifically, at block 120 the user is prompted to enter any options that are applicable to the draw tool selected. The airbrush tool will be described as an example. With airbrush, a color must be chosen. After a color has been chosen, a side bar menu is displayed at block 122 which illustrates other options that may be invoked for the airbrush tool. These typically include selecting a brush size, brush intensity, and other miscellaneous options. Sample side bar menus for various shape tools are described below. The draw tool side bar menus are similar to these.

Once the side bar menu options are entered, a test is made at block 124 to determine if the side button has been depressed. Pressing the side button can mean a cancel/backup or an "undo," depending upon when it is activated. It is noted that at any point during the draw routine and the other routines described below, the side button may be used to return to the main menu through multiple backup or cancel commands.

If the side button has not been pressed, a test is made at block 126 to determine if the tip of the pen has been pressed. If the tip has not been pressed, the routine loops to block 124. Otherwise, a test is made at block 128 to determine if the tip was released prior to moving the pen. If the pen has been moved while the pen tip was pressed against the tablet, the imaging program enters freehand draw mode, shown at block 130. In one embodiment of the invention, freehand draw mode is entered if the pen moves the equivalent of three or more pixels. While in freehand draw mode, freehand edits may be made to the image in a manner similar to prior art imaging programs. This mode will remain until pressure on the pen tip is released. After beginning freehand draw mode, the routine loops to block 124.

If the pen was not moved, e.g., the pen has been moved two pixels or less prior to releasing the tip, the imaging program begins a curve mode by establishing a first endpoint, as indicated at block 132, and drawing a line on the monitor from the endpoint to the current pen position, indicated at block 134. At block 136, a test is made to determine if the tip has been pressed. The imaging program at this point is looking for a second endpoint to be entered. If not, the program loops back to block 136 to await the input. As noted above, the user can go back to the beginning of the routine using the cancel button if the user has changed his or her mind, although this is not shown in the flow diagram. Specifically, the first cancel would place the routine at block 124, the second at either block 122 or 124, depending on the draw tool selected, and subsequent cancels would forward the routine to the main menu.

Once the tip is pressed, the second endpoint is established at the tip position, and a line segment is drawn on the monitor from the two endpoints, as indicated at block 138. At this point in the routine, the imaging program is in "curve draw mode" as indicated at block 140, and the user can make any edits desired using a curvilinear line segment having the established endpoints. The routine loops to block 124 while in this mode.

With reference to block 124, if the side button has been depressed a test is made at block 142 to determine if the imaging program is in either the freehand or curve draw modes. If the imaging program is in either mode, an undo mode will be invoked as long as the side button remains depressed, as indicated at block 144. If at the time of depressing the side button the imaging program is in freehand draw mode, the undo will also be freehand. Selective freehand undo edits are thus available. Similarly, if at the time of depressing the side button the imaging program is in curve draw mode, the undo will be in this mode. Selective "undo" edits are then available using a curve, as opposed to freehand drawing. Releasing the side button will return the imaging program to the drawing mode that was active just prior to depressing the side button.

Once the side button is released, or drawing mode, a test is m not in either drawing mode, a test is made at block 146 to determine if the user wishes to exit. This test generally refers to the user again depressing the side bar, and thus "backing out" of the drawing routine. In this case, the draw routine returns to block 78 of FIG. 3. Otherwise, the routine branches to block 124.

Figure 6:
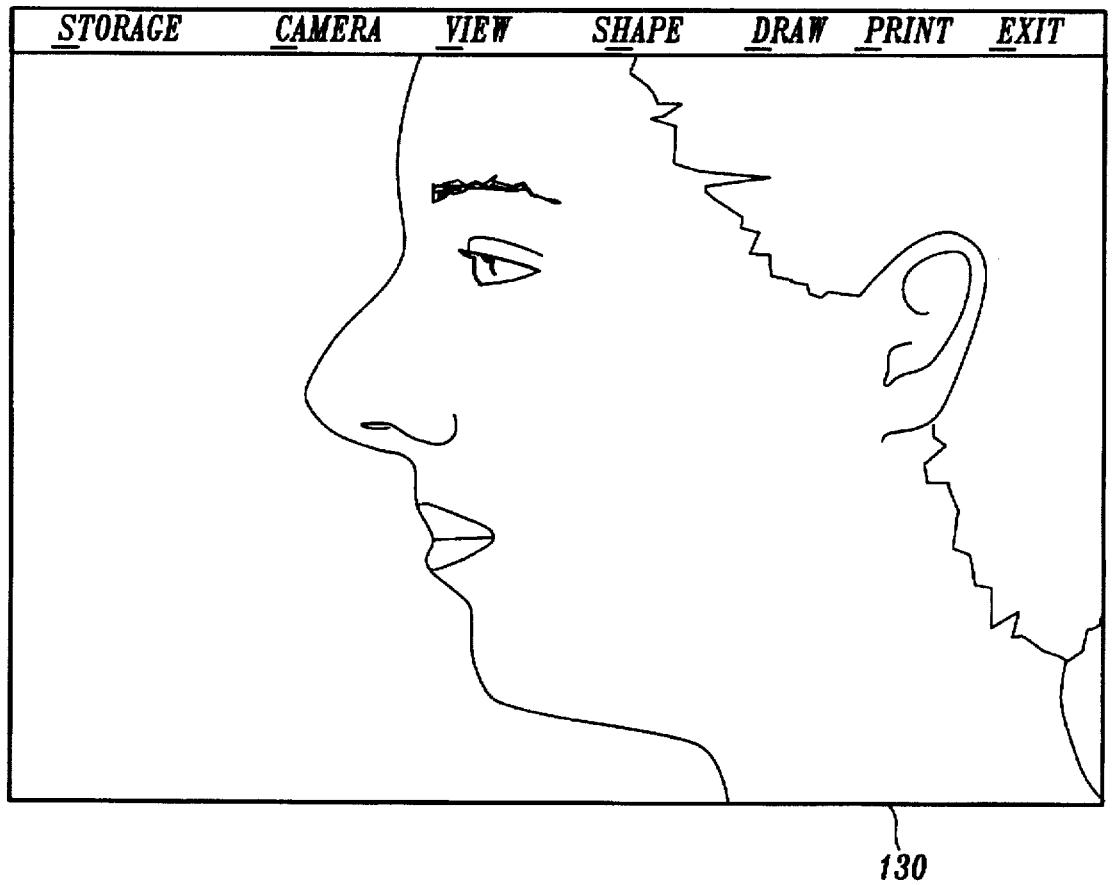
FIG. 6 is a pictorial representation of an image to be edited.

To further exemplify the advantages of the CD draw tool described in FIG. 5, an original (unedited) image 130 that is representative of an image displayed on a monitor is illustrated in FIG. 6. A main menu 132 is displayed across the top of the image to allow a user to select editing, viewing and printing options, as discussed in FIG. 3 and accompanying text. The main menu 132 is from an embodiment of the aesthetic imaging system 20.

FIGS. 7A–7E and 8A–8E contrast exemplary steps taken to make identical edits to the image 130. The steps required to modify the image using a relatively advanced prior art imaging system are illustrated in FIGS. 7A–7E. These steps are modeled after a prior art imaging system that has been distributed by Mirror Image Technology, Inc., a division of Virtual Eyes, Incorporated, the assignee of the present invention. The steps required using an embodiment of the aesthetic imaging system 20 in accordance with the invention are illustrated in FIGS. 8A–8E. Briefly, each set of drawings illustrates examples of edits to a patient's nose, chin, and neck regions. The edits are for use in explaining the invention only, and merely exemplary in nature.

Figure 7E:
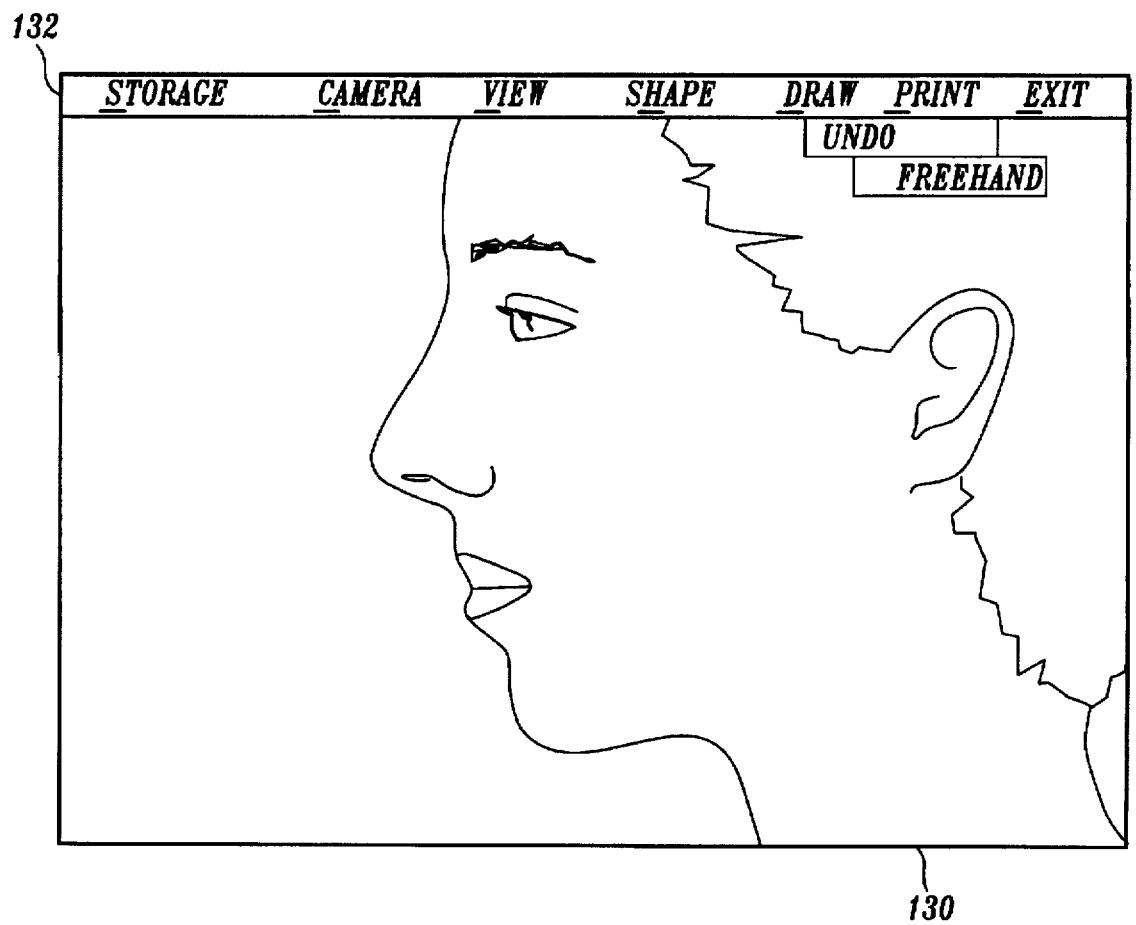

A brief description of the edits follows. With reference to FIG. 7A, the curve option of an airbrush tool is used to modify the bridge of a patient's nose. A resultant curve 134 is displayed having anchor points (endpoints) 136 and 138. In FIG. 7B, a freehand motion is used to eliminate a portion of the tip of the patient's nose. In FIG. 7C, an undo tool is used to replace a portion of the bridge of the patient's nose that was removed by the edits performed in FIG. 7A. In FIG. 7D, the neck area of the patient has been edited using the curve option of an airbrush tool. The resultant curve 140 has anchor points 142 and 144. Finally, in FIG. 7E, an undo tool is used to add back a portion of the neck area that was removed in FIG. 7D. These edits require the following steps:

| FIGURE 7A: | Step S1 | move pen to draw on main menu; |
| --- | --- | --- |
| | Step S2 | select draw; |
| | Step S3 | move pen to airbrush; |
| | Step S4 | select airbrush; |
| | Step S5 | move pen to curve; |
| | Step S6 | select curve; |
| | Step S7 | select an airbrush color; |
| | Step S8 | move pen to the first anchor point position; |
| | Step S9 | select at the position to establish the anchor point 136; |
| | Step S10 | move pen to the second anchor point position; |
| | Step S11 | select at the position to establish the anchor point 138; |
| | Step S12 | move pen to bend the curve 134 into the bridge of the nose; |
| FIGURE 7B: | Step S13 | press the side button on the pen to exit to the main menu; |
| | Step S14 | move pen to draw; |
| | Step S15 | select draw; |
| | Step S16 | move pen to airbrush; |
| | Step S17 | select airbrush; |
| | Step S18 | move pen to freehand; |
| | Step S19 | select freehand; |
| | Step S20 | select a color for the airbrush tool; |
| | Step S21 | use a rubbing motion with the pen to make the freehand edit; |
| FIGURE 7C: | Step S22 | press the side button on the pen to exit to the main menu; |
| | Step S23 | move pen to draw; |
| | Step S24 | select draw; |
| | Step S25 | move pen to undo; |
| | Step S26 | select undo; |
| | Step S27 | move pen to curve; |
| | Step S28 | select curve; |
| | Step S29 | use a rubbing motion with the pen to undo the previous edit; |
| FIGURE 7D: | Step S30 | press the side button on the pen to exit to the main menu; |
| | Step S31 | move pen to draw; |
| | Step S32 | select draw; |
| | Step S33 | move pen to airbrush; |
| | Step S34 | select airbrush; |
| | Step S35 | move pen to curve; |
| | Step S36 | select curve; |
| | Step S37 | select color to be used by the airbrush tool; |
| | Step S38 | move pen to the first anchor point position; |
| | Step S39 | select at the position to establish the anchor point 142; |
| | Step S40 | move pen to the second anchor point position; |
| | Step S41 | select at the position to establish the anchor point 144; |
| | Step S42 | move pen to bend the curve 140 toward the neck, thereby making the edit shown. |
| FIGURE 7E: | Step S43 | press the side button on the pen to exit to the main menu; |
| | Step S44 | move pen to draw; |
| | Step S45 | select draw; |
| | Step S46 | move pen to undo; |
| | Step S47 | select undo; |
| | Step S48 | move pen to freehand; |

-continued

| | Step S49 | select freehand; |
|---|---|---|
| | Step S50 | use a rubbing motion with the pen to undo a portion of the previous edit; and |
| | Step S51 | press the side button to exit back to the main menu. |

Figure 8A:
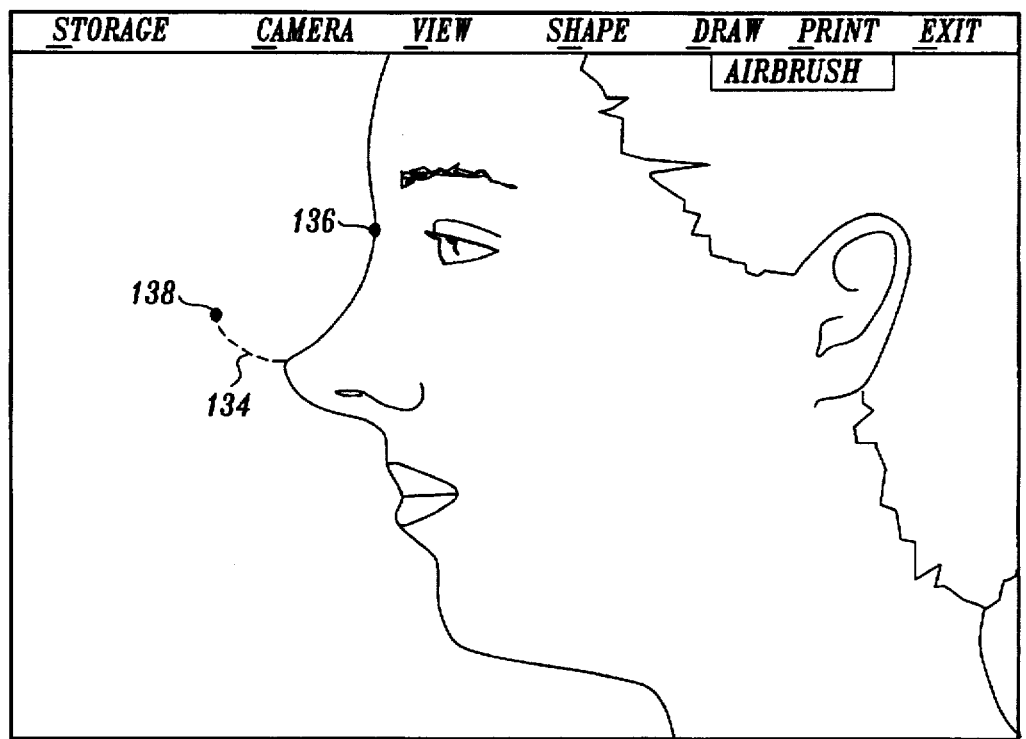
FIGS. 8A-8E are pictorial representations of using the aesthetic imaging system to accomplish the identical edits shown in FIGS. 7A-7E.
Figure 8B:
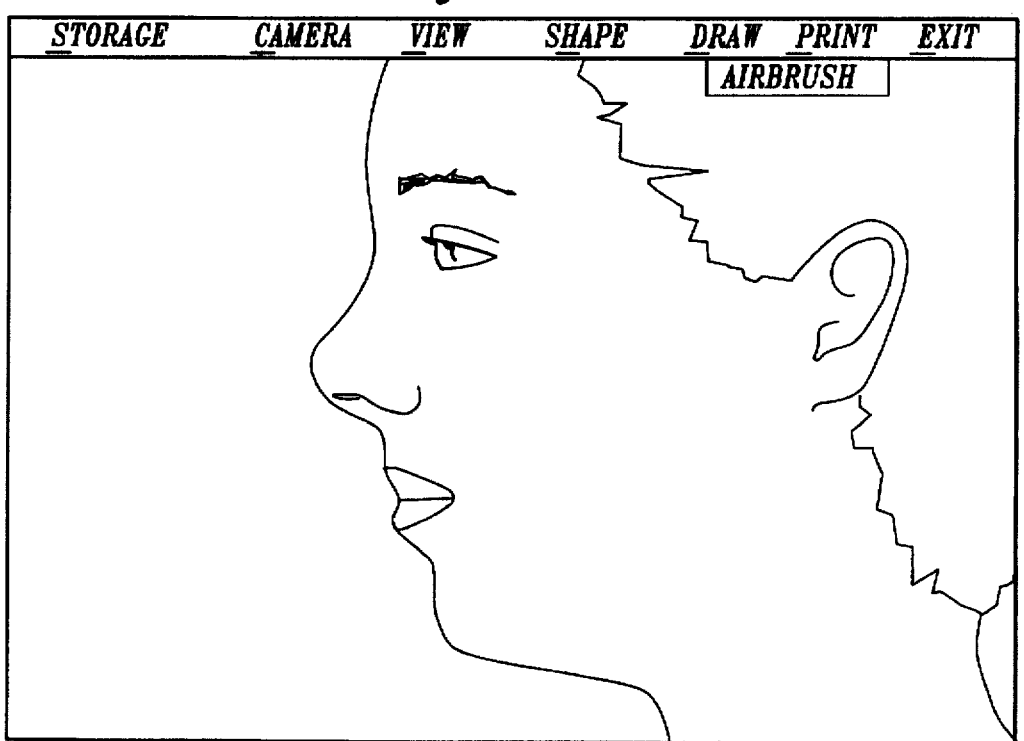
Figure 8C:
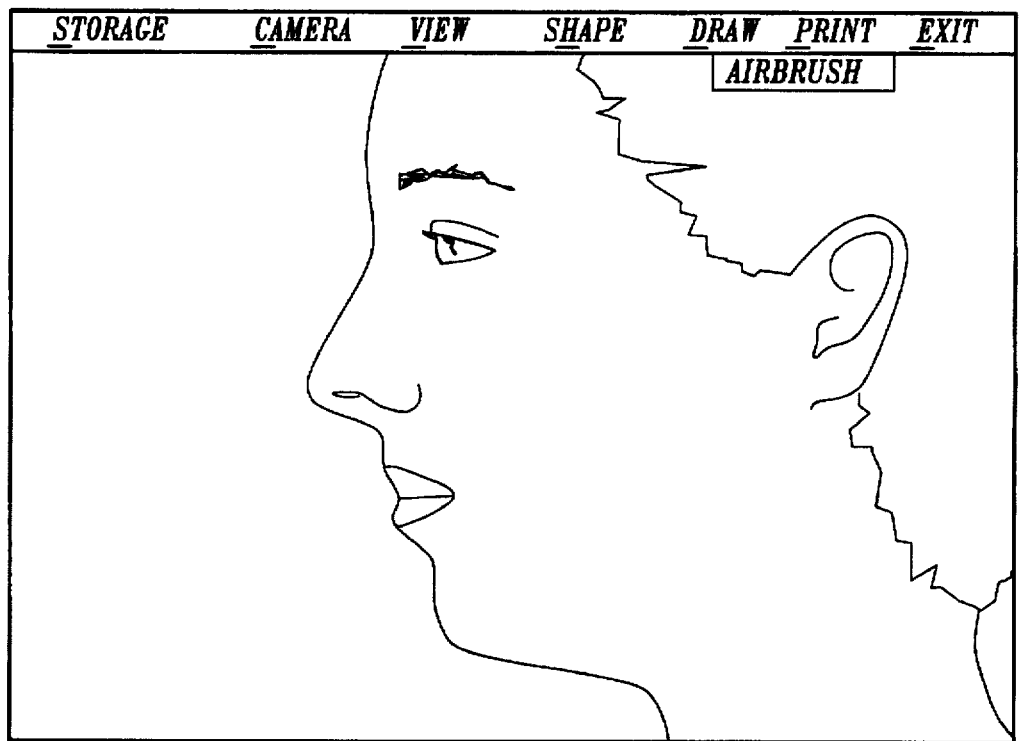
Figure 8D:
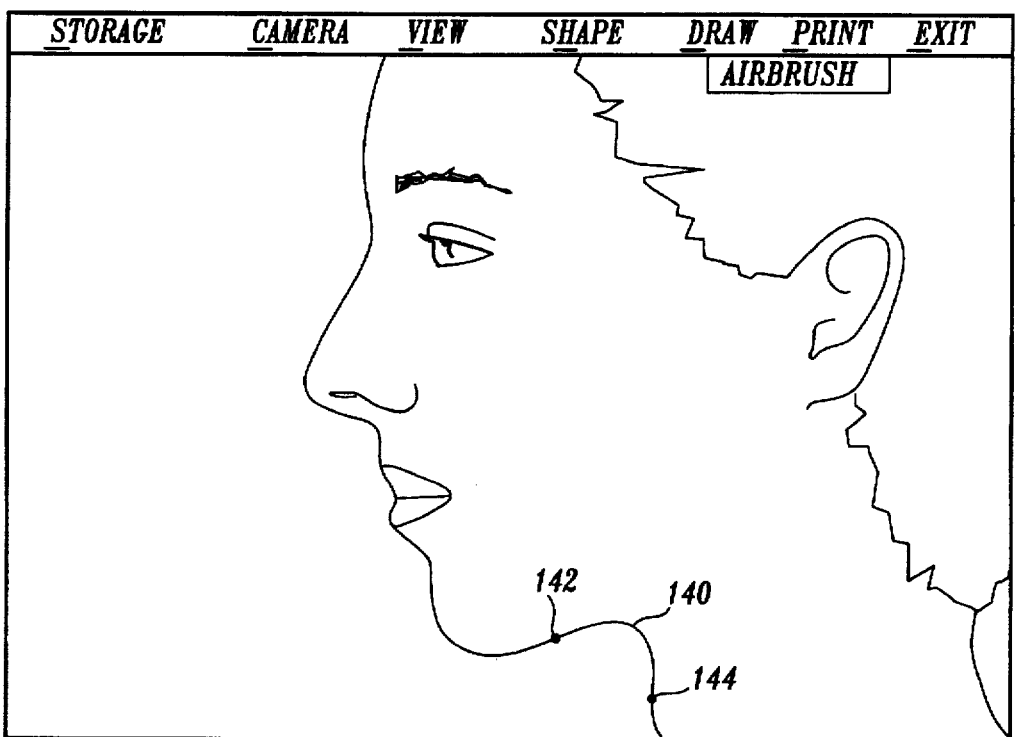
Figure 8E:
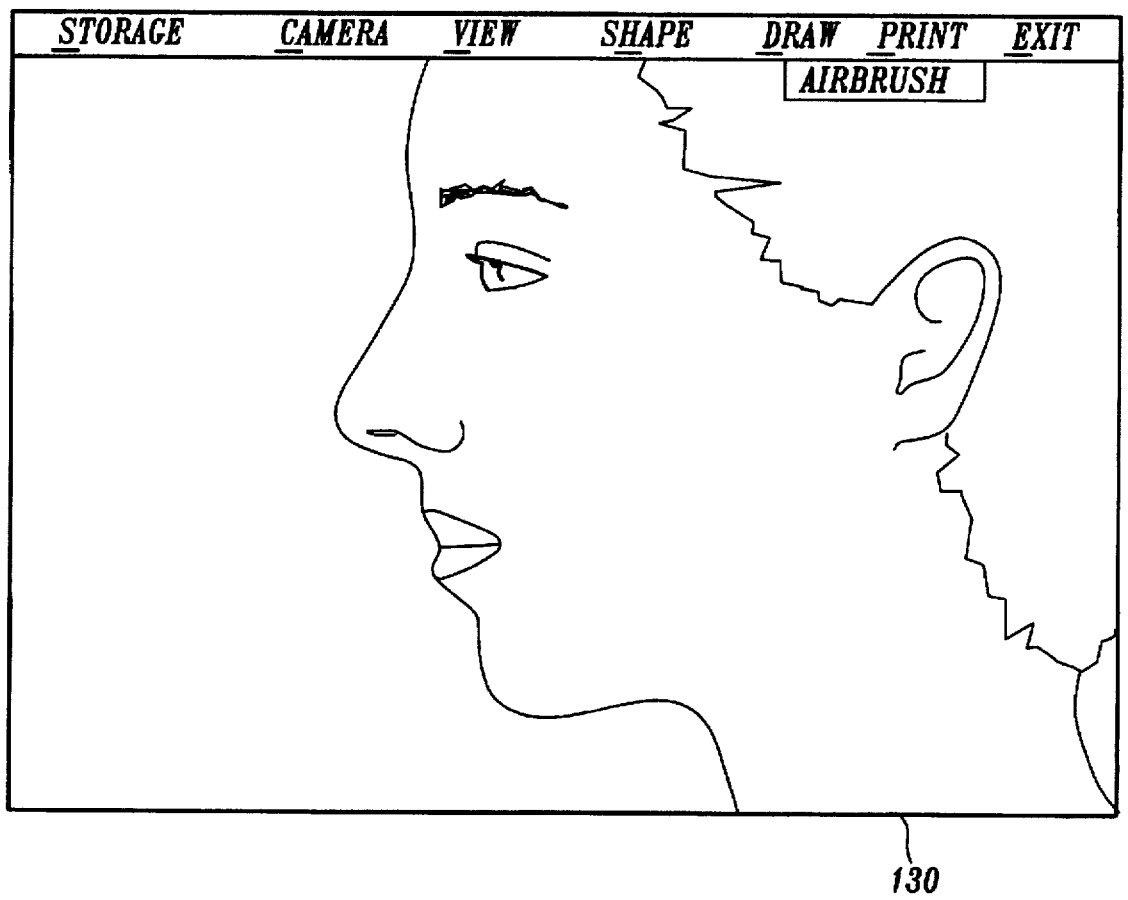

In accordance with the invention, the steps required to perform the same edits using the aesthetic imaging system 20 are now described. With reference to FIG. 8A–8E, the steps required to perform the edits include:

| FIGURE 8A: | Step N1 | move pen to draw; |
|---|---|---|
| | Step N2 | select draw; |
| | Step N3 | move pen to airbrush; |
| | Step N4 | select airbrush; |
| | Step N5 | elect any color for the airbrush tool |
| | Step N6 | move pen to the first anchor point position; |
| | Step N7 | select at the position to establish the anchor point 136; |
| | Step N8 | move pen to the second anchor point position; |
| | Step N9 | select at the position to establish the anchor point 138; |
| | Step N10 | move pen to bend the curve 134 into the bridge of the nose; |
| FIGURE 8B: | Step N11 | pressing the tip of the pen against the tablet and use a rubbing motion to make the freehand edit. |
| FIGURE 8C: | Step N12 | pressing the tip of the pen and the sine button simultaneously, and maintain pressure while rubbing in the area to be undone; |
| FIGURE 8D: | Step N11 | move pen to the first anchor point position; |
| | Step N12 | select at the position to establish the anchor point 142; |
| | Step N13 | move pen to the second anchor point position; |
| | Step N14 | select at the position to establish the anchor point 144; |
| | Step N15 | move pen to bend the curve 140 toward the neck, thereby making the edit shown. |
| FIGURE 8E: | Step N16 | press tip of pen and the side button simultaneously, while rubbing to undo a portion of the previous edit; and |
| | Step N17 | release pressure on the pen and side button, and press the side button to return to the main menu. |

From the simplified edits shown in FIGS. 7A–7E and FIGS. 8A–8E, it will be apparent that the aesthetic imaging system 20 provides a distinct advantage over prior art systems. Specifically, patients find the continued back and forth motions required to select necessary tools from the main menu to be disconcerting. The aesthetic imaging system 20 simplifies the editing process by providing freehand, curve, and undo options in the pen commands themselves, instead of in separate pull-down menus as is done in the prior art. The combination of tools is extremely effective in performing edits quickly, efficiently, and nearly seamlessly, all of which benefit both patient and physician during the consultation process.

Figure 9A:
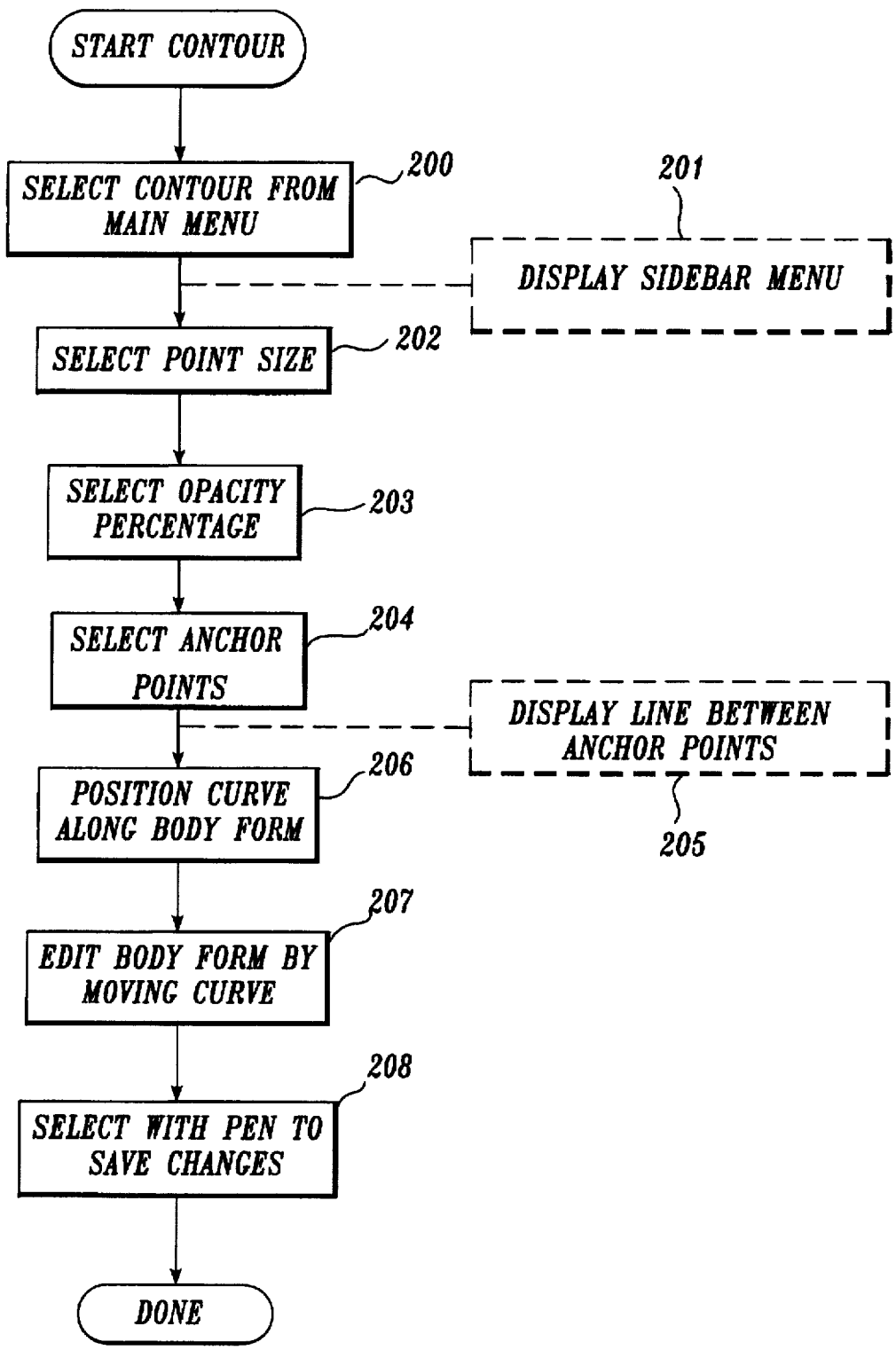
FIG. 9A is a flow chart of an exemplary routine of a contour tool in accordance with the invention.

FIG. 9A illustrates a user interface for a contour tool for use in editing images in accordance with the invention. The contour tool is invoked from the main menu of the imaging program, as indicated at block 200. The contour tool has similarities to a blend tool, but utilizes pixel manipulation to pull pixels from one area to another. For example, the tool works great for chin and lip augmentations.

After the contour tool has been selected, a side bar menu is displayed by the aesthetic imaging system, as indicated at block 201. At block 202, the point size for the tool may be selected from the side bar menu. At block 203, an opacity percentage is entered by the user. If the opacity is at 100 percent, any areas affected by the edit are completely covered by the replacement pixels. As the percentage is reduced, more and more of the original pixels will remain, creating a blending of the replacement and prior pixels.

Anchor points are selected at block 202. The selection is accomplished as described in blocks 128 and 130 of FIG. 5. As also described, once the anchor points are selected, a line is displayed between the points by the aesthetic imaging system, as indicated at block 205. At block 204, a curve having the anchor points as endpoints is positioned along a part of the body, e.g., lips or chin, to be edited. The body part is then edited by dragging the curve in the direction in which a body part is to be augmented. Edits made in block 206 are saved at block 208 by pressing and then releasing the tip of the pen. The program then terminates.

Figure 9C:
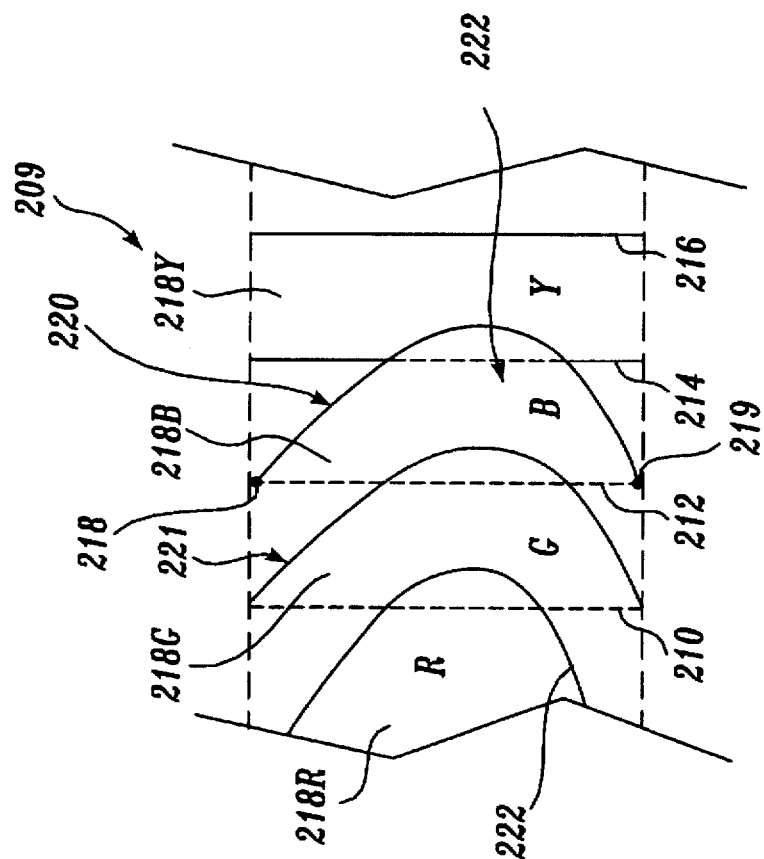
FIGS. 9B-9C are pictorial representations illustrating the function of the contour tool of FIG. 9A.
Figure 9B:
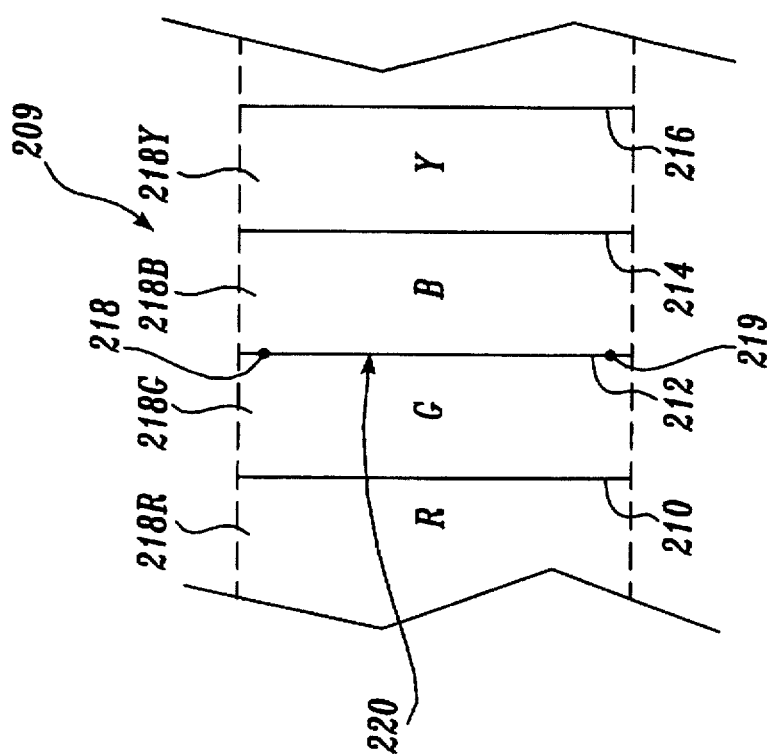

FIGS. 9B–9C further describe the operation of the contour tool, by illustrating how pixels are replicated from one area of an image to another. The image areas described are for exemplary purposes only, and are simplified for clarity in this discussion. With reference to FIG. 9B, an area 209 of an image is comprised of red 218R, green 218G, blue 218B, and yellow 218Y areas separated by boundary lines 210, 212, 214, and 216. It is assumed that a pair of anchor points 218 and 219 have been established by a user along the boundary 212, wherein the aesthetic imaging system will display a line segment 220 between the two anchor points.

In FIG. 9C, it is assumed that the user has moved the midsection of the line segment 220 to the right. In this instance, the blue area 218B has been stretched into the yellow area 218Y. This area is bounded by the line segment 220 (now curved) and the boundary line 214. Also, the green area 218G has been stretched into the blue area 218B. This area is bounded by a curved line segment 221 and the boundary line 212. The red area 218R has expanded into the green area 218G; this area is bounded by a curved line segment 222 and the boundary line 210.

If the opacity level is at 100 percent, the newly defined areas will be comprised of the color being expanded. Thus, the area bounded by segments 220 and 221 will be blue; the area bounded by segments 221 and 222 will be green; and the area bounded by segment 222 to the left edge of the diagram will be red.

If the opacity level is less than 100 percent, pixels from the underlying image areas that are being written over by the newly defined areas will be blended into the newly defined areas. At an opacity of 80 percent, for example, the area bounded by segments 220 and 221 will still be primarily blue, but the portion of this area bounded by the segment 220 and the boundary line 214 may have a yellow tinge; and the portion of this area bounded by the boundary line 212 and segment 221 may have a green tinge. As the opacity percentage is dropped, the effects on these areas will be even greater.

While somewhat simplistic, the illustration in FIGS. 9B and 9C describes the function of the contour tool and the effect on more complicated pixels patterns will be appreciated by those skilled in the art. The area bounded by segment 220, boundary line 214, segment 221, and boundary line 212 will not be affected by changes in the opacity setting.

Figure 9D:
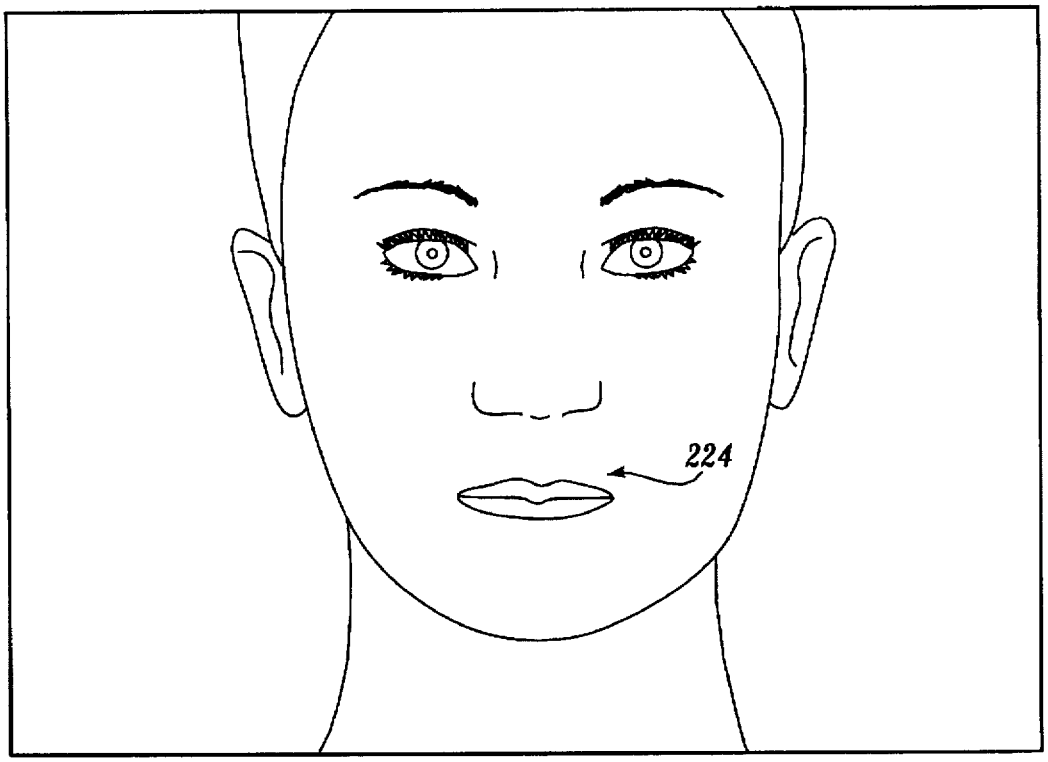
FIGS. 9D-9G are pictorial representations illustrating exemplary edits that may be accomplished using the contour tool.
Figure 9E:
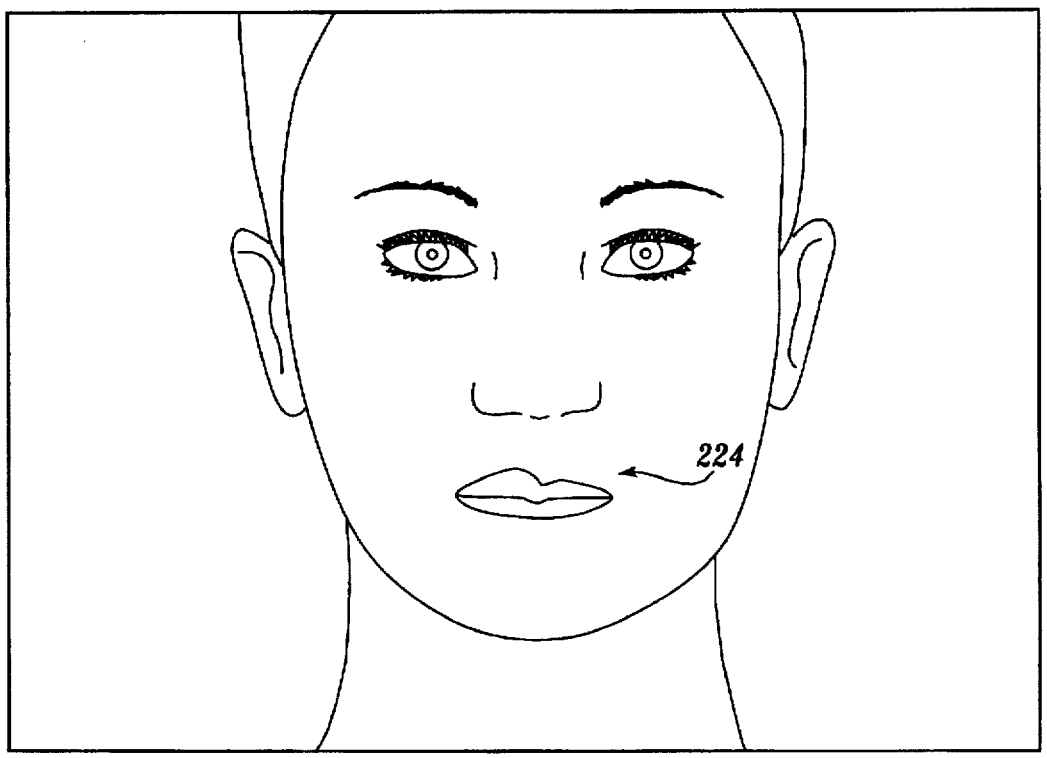
Figure 9F:
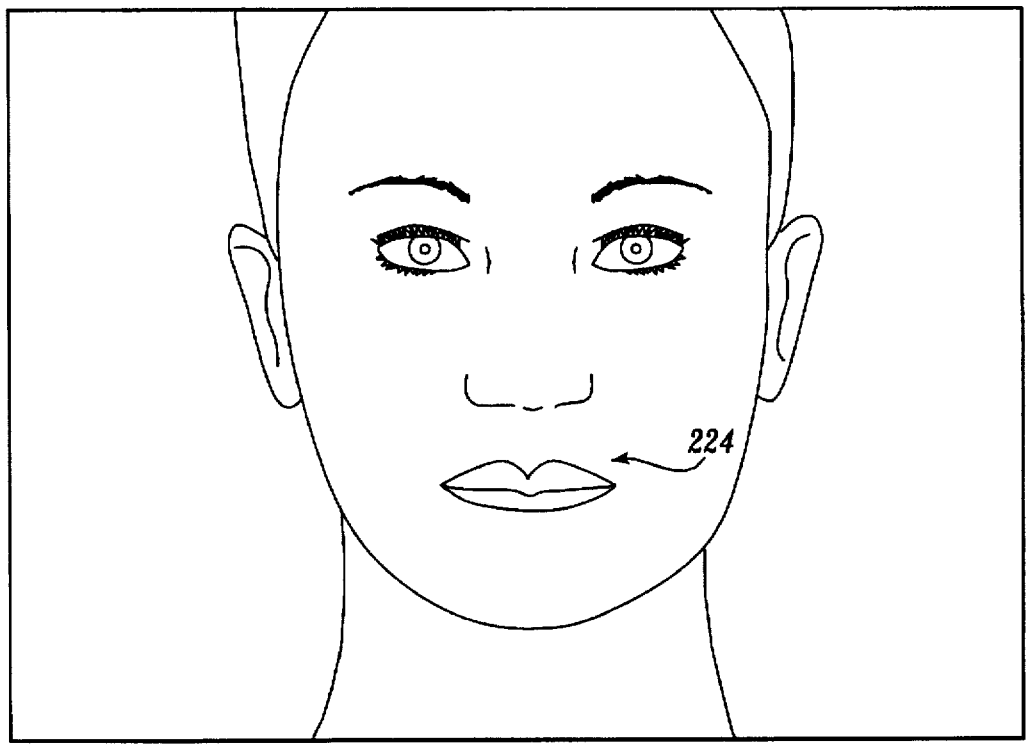
Figure 9G:
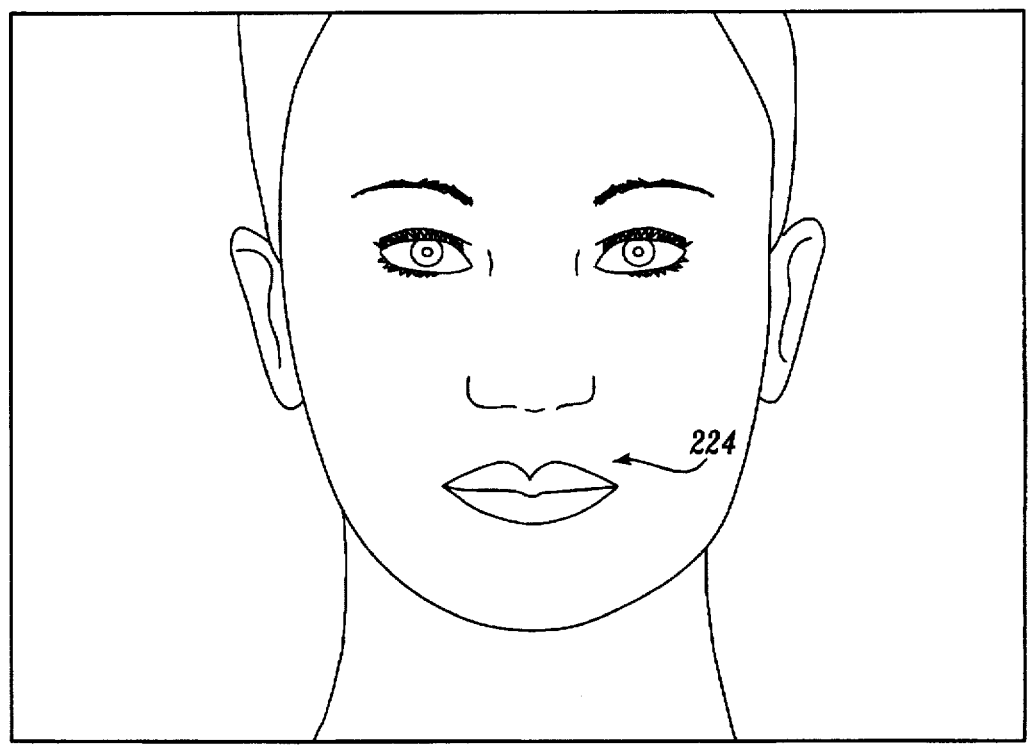

FIGS. 9D–9G illustrate edits to a patient's lips 224 using the contour tool. FIG. 9D is a "before" picture without any modifications. In FIG. 9E, the left side of the person's upper lip has been edited using the contour tool. In FIG. 9F, both the left and right sides of the person's upper lip are shown modified using the contour tool. In FIG. 9G, the lower lip has been edited. Using the contour tool, these edits are accomplished very quickly, in part because the augmented area will automatically match the area around it. The features of the contour tool make it much easier to perform augmentations than is currently available using prior art imaging tools.

Editing Using Shape Tools

FIGS. 10–12B are directed to the shape tool features of the aesthetic imaging system. Similar to the draw tool, the imaging program has a combination feature that is generally available with any of the shape tools. This feature, called the autoblend feature, allows the user to easily move and paste shape tool edits, with or without blending the edges around the edit.

FIG. 10 illustrates an exemplary routine for implementing the autoblend feature of the imaging program. The shape tool group generally includes: Stretch, Copy, Cutout, Rotate, Freeze Compare, and Resize. The routine of FIG. 10 is invoked after a shape tool has been selected at block 80 of FIG. 3. The side bar menu for the selected shape tool is displayed at block 230. Exemplary side bar menus for various shape tools are set forth below. The side bar menus are illustrated in an effort to further detail options available for a given tool, and may be especially helpful for those unfamiliar with imaging packages.

| Copy, Cutout, Resize | Stretch, Rotate | Freeze Compare |
| --- | --- | --- |
| ● | ● | ● |
| ● | ● | ● |
| ● | ● | ● |
| • | • | • |
| Zoom | Z | Z |
| Undo | U | U |
| Compare | C | S |
| Split image | S | |
| Inverse | I | |
| Blend | B | |

The black dots are brush size options that allow a user to choose the thickness of a shaping tool. The zoom option allows a user to look at an image in greater detail. When the zoom option is invoked, the aesthetic imaging system displays a square overlaid on the image. The square can be positioned by the user with the pen. After positioning the square, that area of the image will be magnified when the pen is selected. Cancelling with the pen will display normal viewing mode. The undo option allows a user to undo edits to an image. The compare option allows a user to transition between before and after images. The split image option allows a user view before and after images side by side. The inverse option creates the mirror image of all or only a portion of an image that has been designated by the user. The blend tool will blend edits with the surrounding area. Many of the options shown are also implemented as separate tools under View in the main menu. These are described in greater detail below.

It is noted that the side bar menus available for the drawing tools are similar to the shape tool side bar menus shown. They do, however, typically include an option wherein the user may choose the intensity or opacity of a color used in conjunction with a draw tool.

At block 232, the user is prompted to designate an area of the image to be edited. In a preferred embodiment, this is accomplished by pressing down on the pen and freehand drawing an area, e.g., a circle, that is to be subject to the edit. In this regard, the imaging program contains a unique feature wherein if a partial area is designated and the pen subsequently released, the drawing area will automatically be formed into a contiguous area by the imaging program. At block 236, a test is made to determine if an area has been designated by the user. If not, the routine loops back to block 234 and awaits a designation.

Figure 12A:
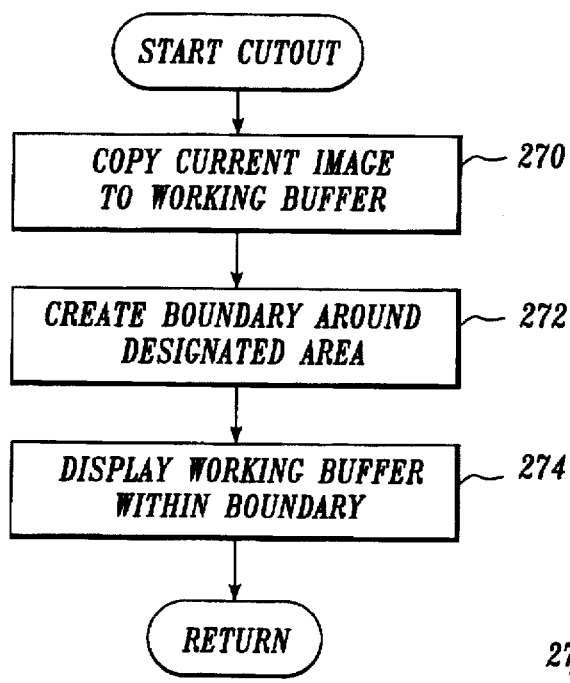
FIG. 12A is a flow chart of an exemplary routine illustrating a cutout tool in accordance with the invention.
Figure 12B:
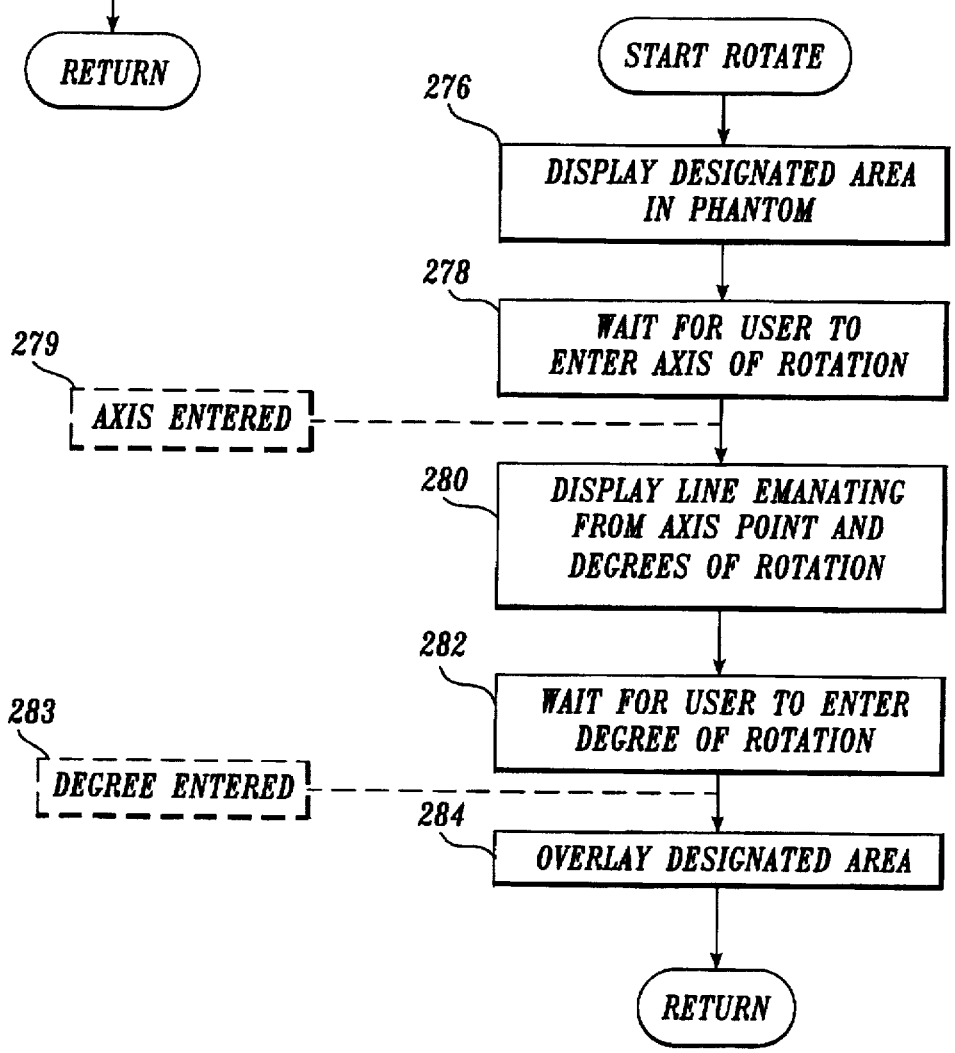
FIG. 12B is a flow diagram of an exemplary routine illustrating a rotate tool in accordance with the invention.

After an area has been designated, any edits to the designated area of the image are performed in accordance with the selected shape tool, as indicated at block 236. Two exemplary shape tools for editing an image are illustrated in FIGS. 12A and 12B. At block 238, a test is made to determine if editing of the designated area is complete. In one embodiment, this involves testing for when the user "selects" with the pen anywhere on the tablet. The routine remains at block 238 until editing is complete (or the user exits using the side button). Upon completion of the edits, an autoblend box is displayed in the vicinity of the edited area, as indicated at block 240.

At block 242 a test is made to determine if the tip of the pen has been pressed against the tablet. If not, the routine loops, testing for this occurrence (or an exit command from the user). After the pen tip has been pressed, the imaging program calculates the location of the pen relative to the autoblend box.

Figure 11:
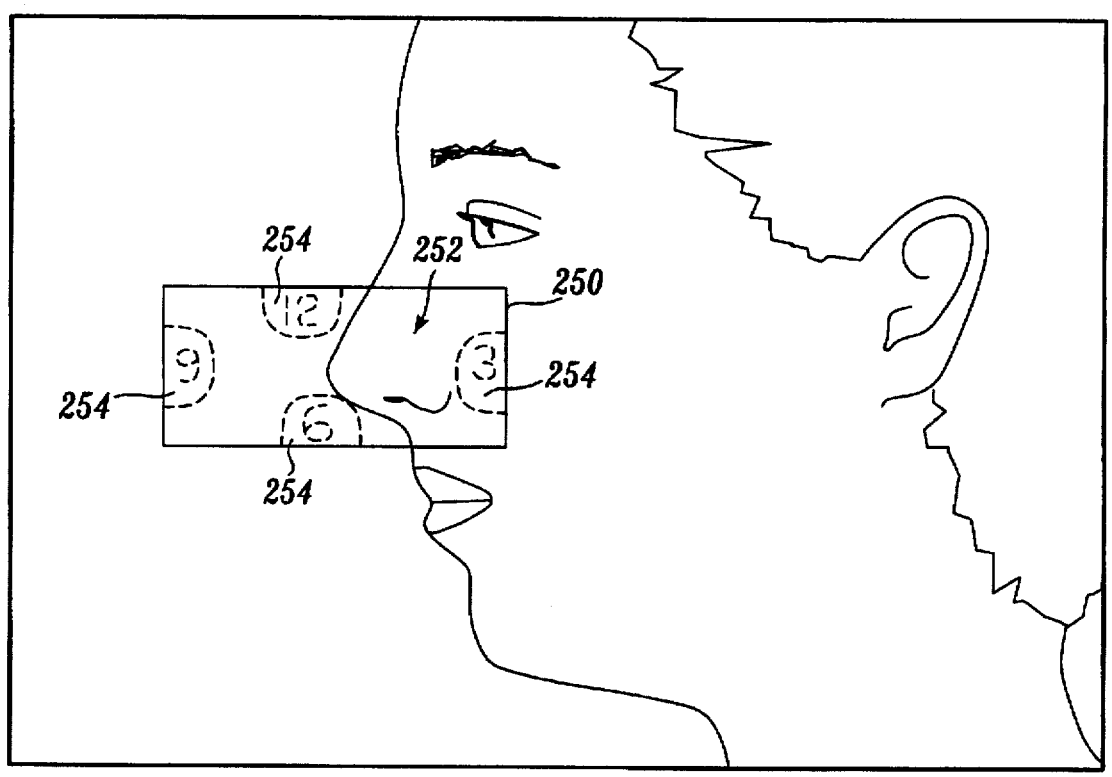
FIG. 11 is a pictorial representation of a user interface for implementing the autoblend tool of FIG. 10.

FIG. 11 illustrates an example of an autoblend box 250 that may be drawn by the aesthetic imaging system in accordance with the invention. As is discussed above, the autoblend box 250 may be used to: (1) move an edited area, (2) paste the edited area onto the image while blending the edge created between the edited area and the rest of the image, and (3) paste the edited image without blending. While the autoblend box 250 uses the conventions set forth below, those skilled in the art will appreciate that other conventions may be used without departing from the scope of the invention.

To move an edited area, the user must press down on the pen anywhere inside the autoblend box, except not at the three-, six-, nine-, and twelve-o'clock positions of the box. The "move" area is designated with reference numeral 254. To paste the edited area without blending, the user must press within the outlined areas 254 at the three-, six-, nine-, and twelve-o'clock positions inside the box. Selecting anywhere outside the box, i.e., area 256, results in the edited area being pasted with blending.

With reference again to FIG. 10, a test is made at block 244 to determine if the pen tip has been pressed at a location outside of the autoblend box. If the pen tip was pressed at a location outside the autoblend box, the edit area is pasted with a blending of the edges at block 260. Otherwise, a test is made at block 262 to determine if the tip location was within the approximate three-, six-, nine-, and twelve-o'clock areas of the autoblend box. A pressing of the tip within any of these areas results in the edited area being pasted without blending, as indicated at block 264. As indicated at block 266, a selection in a location in the autoblend box apart from the three-, six-, nine-, and twelve-o'clock areas will allow the image to be moved. In this case, the edited area will track movement of the pen as long as the tip remains pressed. After a move is completed, the routine loops to block 242.

If a paste has been accomplished using blocks 260 or 264, a test is made at block 268 to determine if the user wishes to exit the shape routine, e.g., by pressing the side button. If not, the routine loops to block 232 where a new area of the image may be considered. Otherwise, the routine returns to block 82 of FIG. 3.

FIGS. 12A and 12B illustrate two exemplary shape tools that are available when using the aesthetic imaging system. With reference to FIG. 12A a cutout tool is unique in that a user can select an area of the image to be cut out, thereby creating a "hole" in the image, and an identical image underneath the cutout image can then be moved in all directions as it is viewed through the hole. The cutout feature is especially useful for profile views including chin augmentation, brow lifts, and maxillary and mandibular movement; and frontal views, including otoplasty, brow lift, lip augmentation, nasal base narrowing, and maxillary and mandibular movement.

At block 270, the current image is copied to a working buffer. As is discussed in FIG. 10, when the cutout subroutine is called the user has defined an area of the image to be edited. At block 272, a boundary is created around the designated area designated in block 234 of FIG. 10. At block 274, the working area is displayed inside the boundary, and the current image displayed outside the boundary. In this manner, the image in the working buffer can be moved relative to the image in the current buffer until the desired alignment has been achieved. The program then returns to the routine of FIG. 10.

Upon returning to block 238, the edit may be frozen by selecting with the pen. Thereafter, the autoblend box is displayed. Selecting within the area 252 of the autoblend box allows the designated area to be moved. Selecting anywhere outside the autoblend box will make the edit permanent, with automatic blending. Selecting within the box at the three-, six-, nine- or twelve-o'clock positions (areas 254) will make the edit permanent, without blending.

With reference to FIG. 12B, a rotate tool in accordance with the invention is particularly useful when editing profile views including the nasal tip, mandible, maxilla and brow areas; and frontal views including nares, brows, and the corners of the mouth. As is discussed in FIG. 10, when the rotate routine is called, the user has defined an area of the image to be edited. At block 276, the area designated in block 234 of FIG. 10 is shown in phantom. At block 278, the imaging program waits for the user to enter an axis of rotation. An axis is then entered by the user, as indicated at block 279.

Once an axis of rotation is entered, a display line emanating from the axis point is displayed on the monitor, as indicated at block 280. Also, the number of degrees of rotation is displayed. The position of the pen dictates the degree of rotation. As the pen is moved away from the axis point, the display line will lengthen, providing the user greater control of the rotation of the designated area. At block 282, the system waits for the user to enter a desired degree of rotation. The degree of rotation is entered by the user by selecting with the pen, as indicated at block 283. Once the degree of rotation is entered, the designated area is redrawn onto the current image, as indicated at block 284.

After the redraw, the routine returns to FIG. 10. Upon returning, the autoblend box is displayed. Selecting within the autoblend box allows the designated area to be moved. Selecting anywhere outside the autoblend box will make the edit permanent, with automatic blending. Selecting within the box at the three-, six-, nine-, and twelve-o'clock positions will make the edit permanent without blending.

While prior art imaging programs have a rotate feature, they do not allow a user to select the axis of rotation. The ability to select the axis is valuable in the procedures listed above.

Viewing an Image

FIG. 13 illustrates an exemplary routine for implementing the view features of the imaging program. In FIG. 13, the solid blocks indicate user interface options presented to the user by the aesthetic imaging system and the dashed blocks represent system responses to the decisions made. The view group includes: Compare, Prioritize, Split Image, Mirror Image, and Restore to Original, as well as other options. At block 300, a test is made to determine if the Compare option has been selected.

The Compare option allows a modified image to be compared to the original image so that a viewer can more readily see the changes. Specifically, as the pen is floated from the top to the bottom of the tablet, the user will see one image transition or "morph" into the other. This type of feedback is much more powerful than a side-by-side comparison of the two images. In addition, a user can press the tip of the pen to freeze an image displayed on the monitor that is anywhere from zero to 100% of the transition from the original to the modified image. This is extremely helpful where edits have been performed on an image that are not realistically achievable in surgery, but an achievable result lies somewhere between the original and the modified image. For example, it is easy to edit a blemish on a face so that area resembles the surrounding skin and thus becomes invisible. However, the total removal of the blemish may not be realistic. In this case, a transition of that area toward the original image will "fade in" the blemish to provide a realistic image of what surgery can achieve.

Figure 14A:
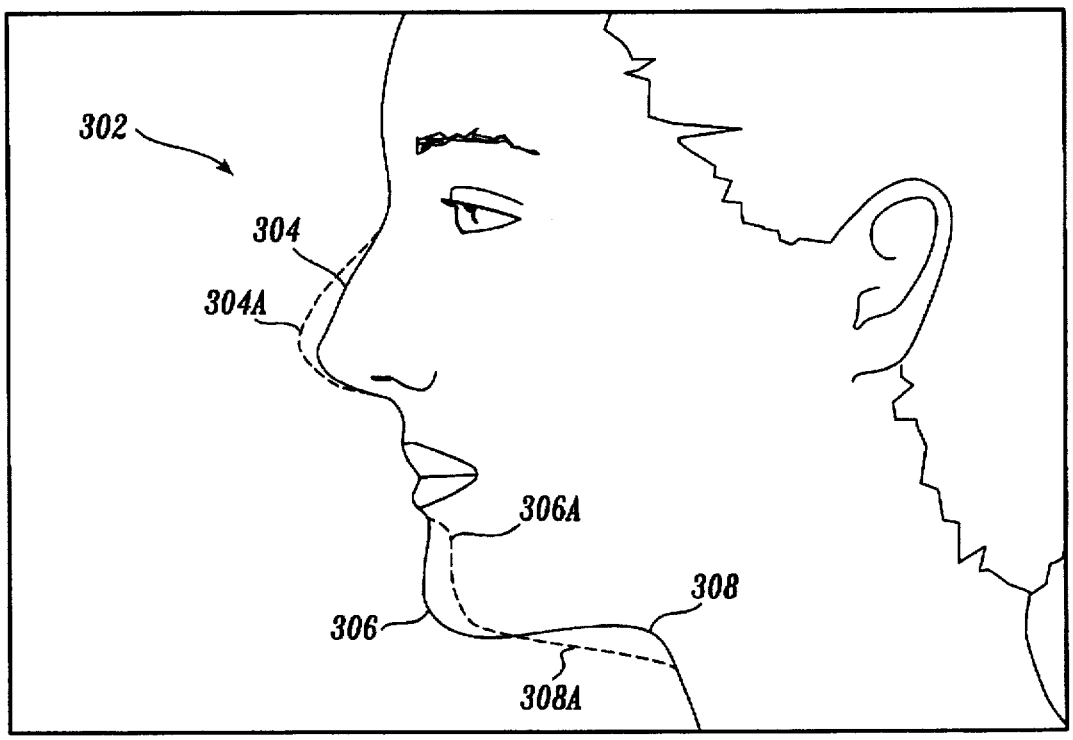
FIGS. 14A-14D are pictorial representations illustrating the effects of a compare feature in accordance with the invention.

Another option that is a subset of the Compare option is the Prioritize option. The Prioritize option allows a user to designate areas that have been edited so that the user can selectively illustrate the effects of two or more procedures that have been shown to a patient. For example, FIG. 14A illustrates a modified profile image 302 of a patient that includes a rhinoplasty procedure (nose) 304, a chin augmentation procedure 306 and a submental lipectomy procedure (neck) 308. The boundaries that have been edited are illustrated by dashed lines 304a, 306a, and 308a, corresponding to the patients original nose profile, chin, and neck, respectively. Using the Prioritize option, the user can designate one area on the modified image, and illustrate transitions between the original and modified images at that area only by floating the pen. Any areas not selected will continue to be displayed as the original image.

With reference again to FIG. 13, if the Compare option has been selected, a test is made at block 309 to determine if the entire image is to be compared or only certain portions of the image, i.e., using the Prioritize option. If less than the entire image is to be compared, the user is prompted to enter the area or areas that are to be compared at block 310. Once one or more "priority areas" are defined, or if all of the edits are to be reviewed during the comparison, at block 311 the user is prompted to float the pen in a vertical motion on top of the tablet to transition between the original and modified images, in accordance with earlier options selected. An illustration will clarify this point.

Figure 14B:
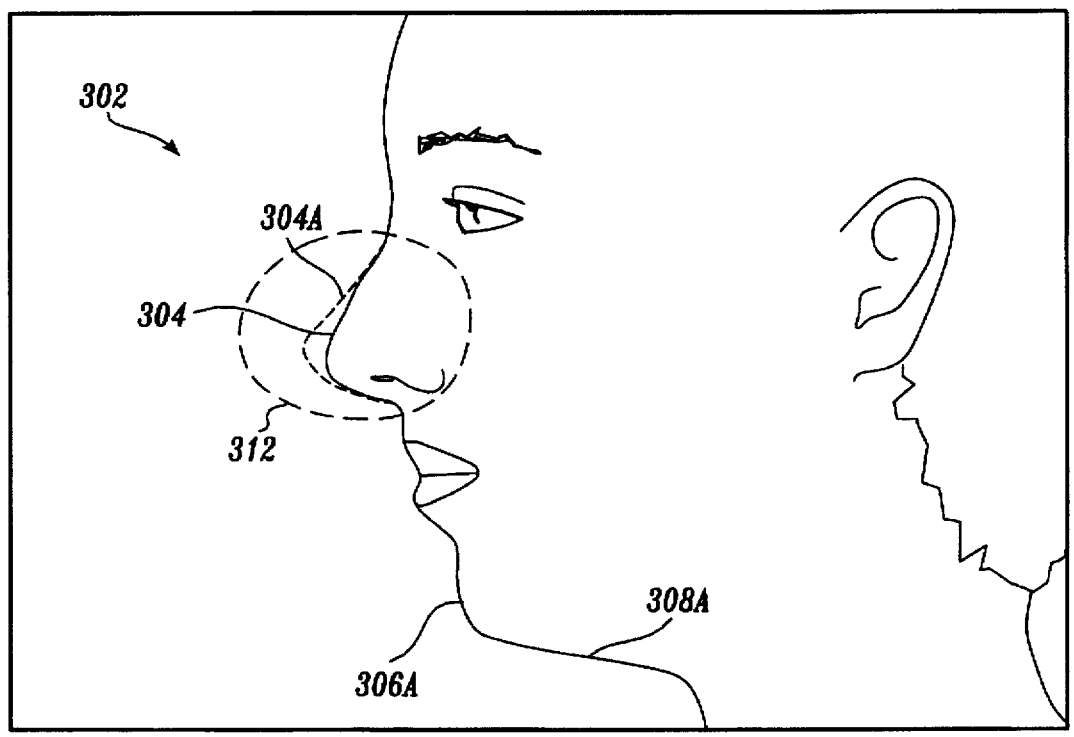
Figure 14C:
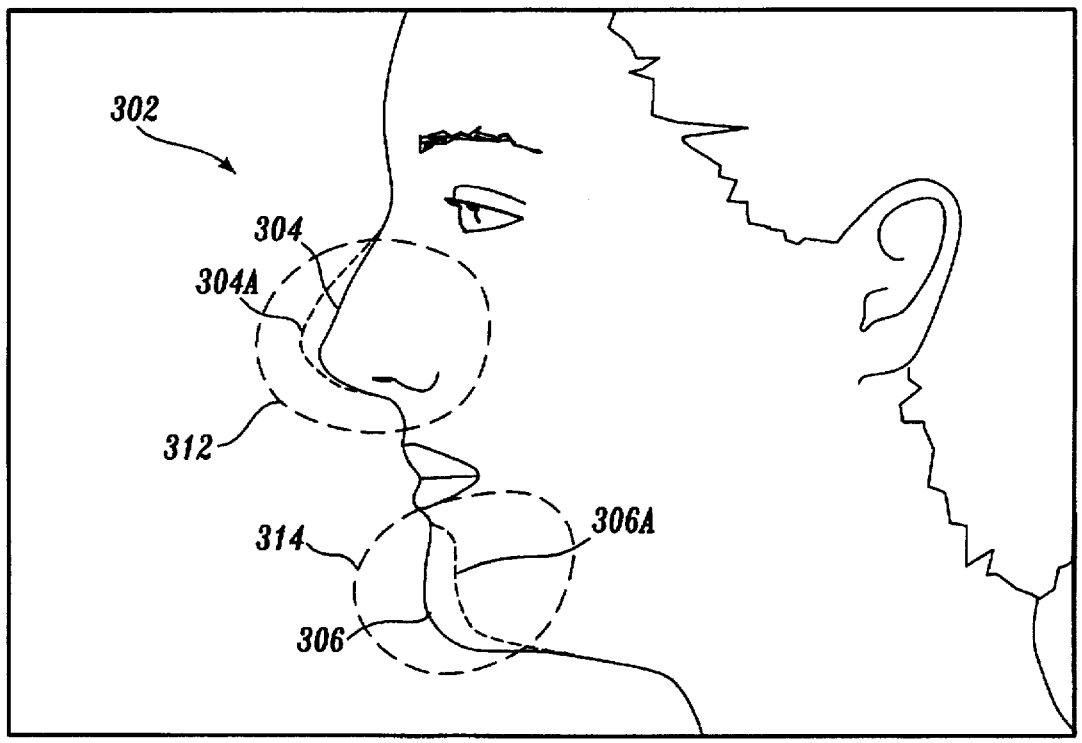

In FIG. 14B, a first priority area 312 has been defined that corresponds generally to the nose. Given this selection, the nose area only will transition from original to modified as the pen is moved, with the rest of the image being displayed unedited. Thus, the modifications to the chin and neck no longer are shown. In FIG. 14C, a second priority area 314 has been defined that corresponds generally to the chin. The first priority area 312 has been kept. Given these selections, the nose and chin areas only will transition from original to modified as the pen is moved, with the rest of the image being displayed unedited. Thus, the modifications to the neck are not illustrated.

Figure 14D:
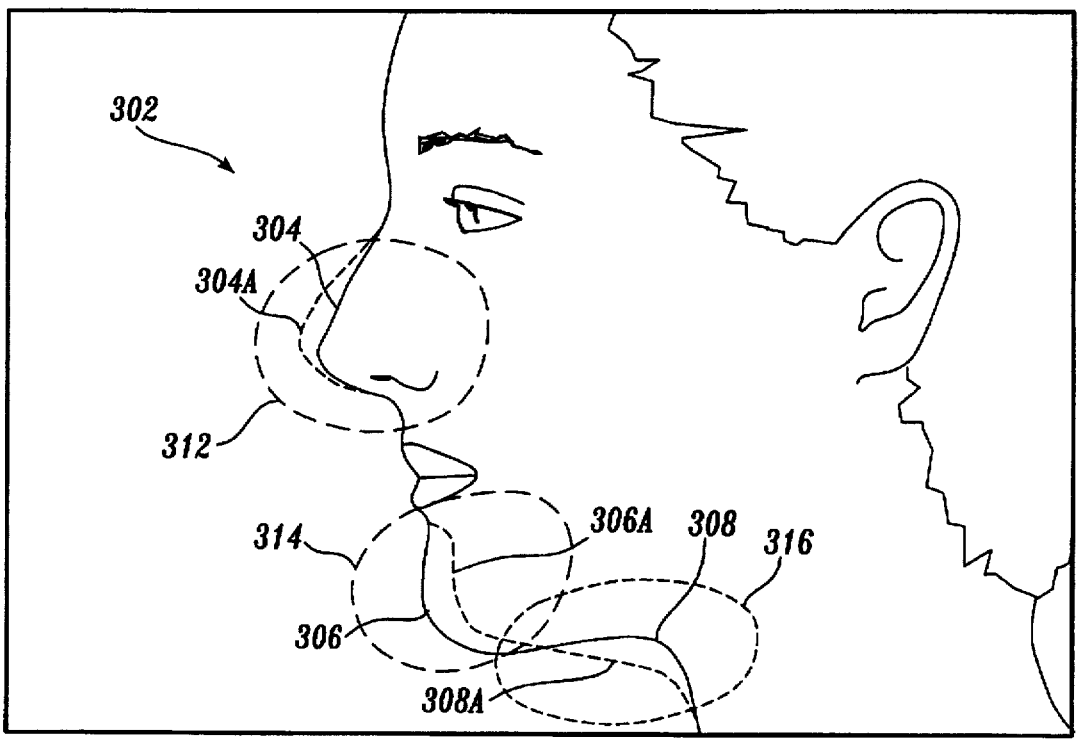

With reference to FIG. 14D, a third priority area 316 has been defined that corresponds generally to the neck, along with the former designations. Given these selections, all three priority areas 312, 314, and 316 transition with movement of the pen. Again, the undesignated portions of the image are displayed in an unedited form, even if parts of the image outside the priority areas have been edited (no edits are shown). Because edits have not been made, from a user's standpoint the transition in FIG. 14D appears to be a comparison between the original and modified images.

With reference again to FIG. 13, at block 320 a test is made to determine if the user wishes to save a transitional or morphed view of an image. If a transitional view is to be saved, the user may establish the percentage transition, i.e., anywhere from zero to 100 percent transition (zero percent being the original image and 100 percent being the edited image), by floating the pen up or down above the tablet to establish the view, and the pressing the tip of the pen against the tablet to freeze the transitional image, as indicated in block 322. If the tip is pressed again, the frozen image is saved. The save options are available with or without the priority areas in effect. After the save has been accomplished, or if the user did not wish to save a transitional view of an image, the Compare option is complete and the routine branches to block 326.

In an alternative embodiment of the invention, the Compare option allows a user to compare a modified image with any edits made to the modified image during the current editing session, i.e., before the changes are permanently saved to the modified image. Specifically, with reference to FIG. 2, this embodiment of the Compare option contrasts the image in the current image buffer 54 with the image in the modified image buffer 52. As discussed above, this embodiment of the Compare option may also be used in conjunction with the Prioritize option to allow the user to select priority areas for comparison. In this case, the priority areas transition from the modified to the current image, while the modified image only is displayed in the other (nonselected areas) areas.

At block 326, a test is made to determine whether the user wishes to view a split image. The Split Image option is used on a frontal picture only, and allows a patient to see his or her asymmetries. If a split image view is desired, the user is prompted to select an image, e.g., original or modified, at block 330. At block 332, a vertical centerline is displayed on top of the selected image. The user is then prompted to position the centerline at the location desired, as indicated at block 334. Typically, the centerline will be positioned to dissect the image into equal halves, using the nose and the eyes as reference points. At block 336, the aesthetic imaging system displays two images, one showing the left halves pieced together and the other the right halves pieced together. Specifically, the aesthetic imaging system will produce an inverse image of the left (right) half and then add it to the left (right) half.

Figure 15A:
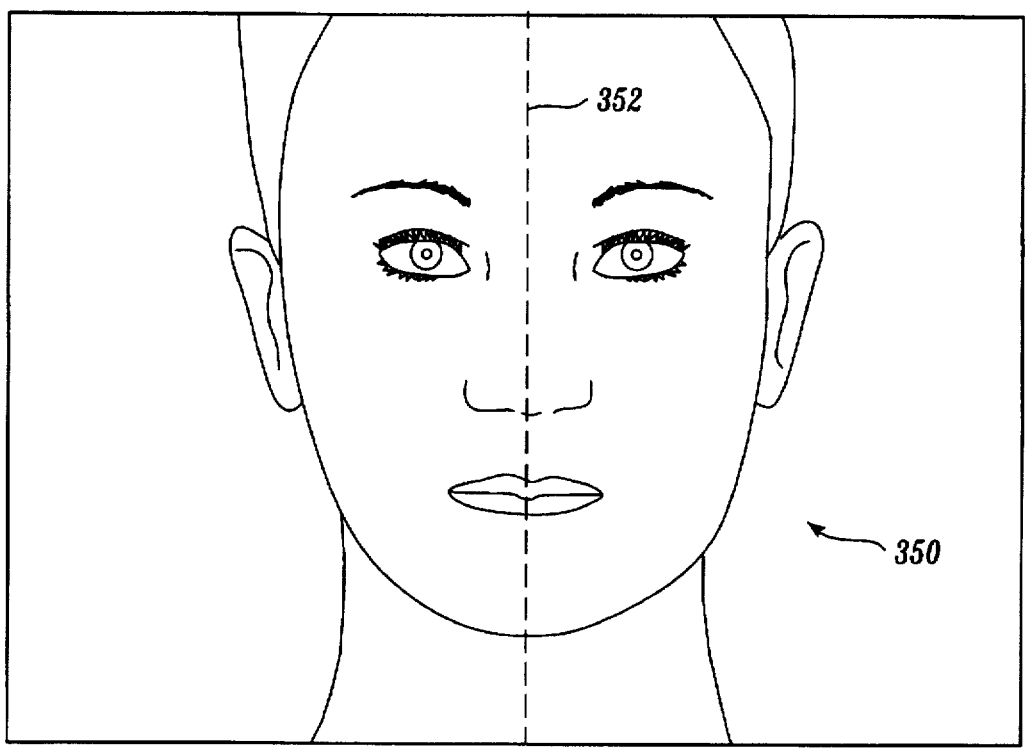
FIGS. 15A-15C illustrate a split image option of viewing images in accordance with the invention.
Figure 15B:
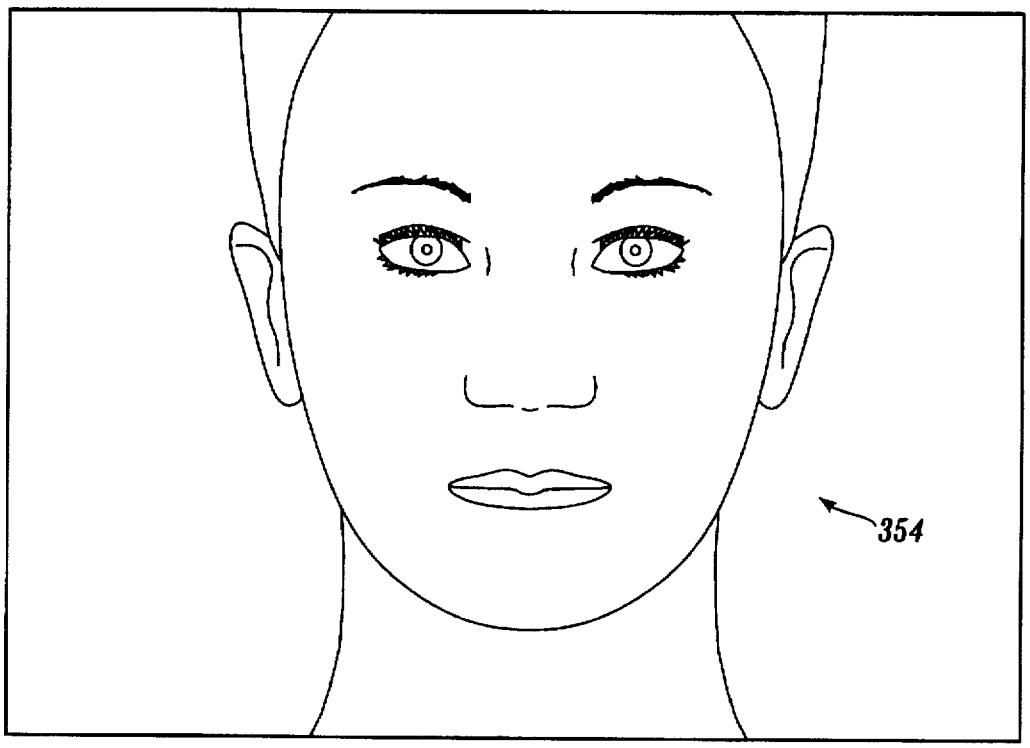
Figure 15C:
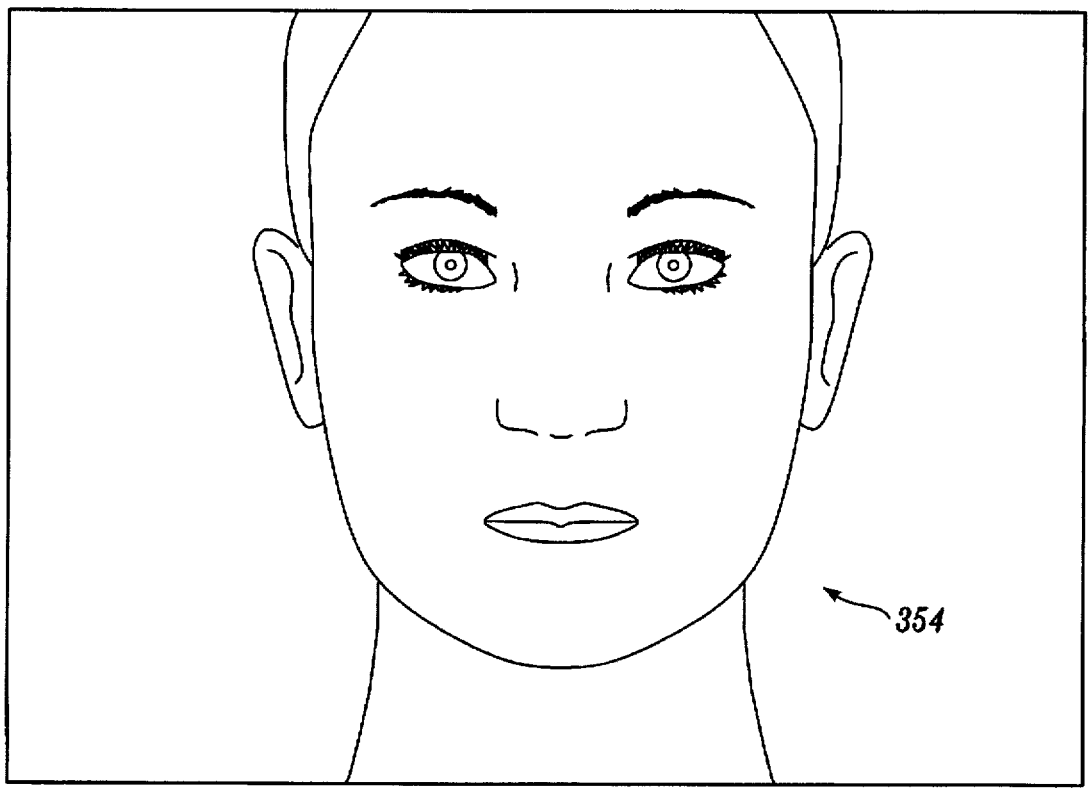

FIGS. 15A-15C illustrate the resultant images that are displayed when the Split Image option is invoked. In FIG. 15A, a frontal image 350 of a patient is shown, including a centerline 352 that has been positioned at the center of the patient by a user. FIG. 15B is an illustration of the left halves of the image after being pieced together by the aesthetic imaging system, as indicated by reference numeral 354. FIG. 15C is an illustration of the right halves of the image, as indicated by reference numeral 356. With the Split Image option, patients can view what they would look like if their faces were symmetrical. The tool is especially useful in the consultation stage because many people do not realize that the typical face is asymmetrical, and changing a face to be perfectly symmetrical, if possible, is not necessarily desirable.

Once the split images have been displayed, or if the Split Image option was not selected, a test is made at block 360 to determine if the user wishes to view an inverse or minor image of a picture, e.g., to show patients the view they see of themselves when looking into a minor. If an inverse image is desired, the user is prompted to select an image to be viewed at block 362. The selected image is then "flipped" using the aesthetic imaging system, and displayed on the monitor, as shown at block 364. After the image has been displayed, or if the inverse image option was not invoked, routine returns to block 86 of FIG. 3.

While the preferred embodiment of the invention has been illustrated and described, it will be appreciated that various changes can be made therein without departing from the spirit and scope of the invention. For example, the advantages of the aesthetic imaging system are not limited to imaging for cosmetic surgery only, but are applicable to a number of medical imaging fields, including endoscopy, pathology, and hair restoration. Those skilled in the art will recognize adaptations that may be made to accommodate these medical imaging fields without departing from the scope of the invention. Also, a different style of pointing device may be used in lieu of the pen and tablet.

The embodiments of the invention in which an exclusive property or privilege is claimed are defined as follows:

1. In an aesthetic imaging system for use in imaging a patient, a method of simultaneously displaying a plurality of digital images of the patient for comparison thereof, the aesthetic imaging system including: a video camera; and a computer processor, image storage memory containing a first stored image of the patient taken at an earlier time, and a monitor, all operably coupled to the video camera, the method comprising:

(a) positioning the patient in front of the video camera so that a second live digital, image of the patient is captured by the video camera;

(b) displaying the second, live digital image of the patient on the monitor; and (c) displaying the first digital image of the patient in a fixed position on the monitor with the second live digital image overlaid on the first digital image and with one of the first or second digital image being substantially translucent to allow the patient to view the first digital image through the second live digital image and to adjust the relative position of the video camera and the patient in order to align the first and second digital images of the patient on the display.

2. The method of claim 1, wherein the image of the patient is continuously captured and displayed on the monitor so that the patient may reposition relative to the video camera and see the effect the repositioning has on the second digital image displayed on the monitor.

3. The method of claim 2, wherein a second digital image may be selected and stored for subsequent manipulation by the aesthetic imaging system when a desired position of the patient is achieved.

4. The method of claim 3, further comprising the step of displaying the stored first digital image and the stored second digital image side-by-side on the monitor to allow an accurate comparison of the first and second digital images.

5. The method of claim 1, wherein the first and second digital images are transposed around a vertical axis so that the first and second digital images of the patient are displayed as mirror images on the monitor.

6. An imaging system for capturing a current digital image of a patient for comparison with an earlier, stored digital image of the patient, the imaging system comprising:
(a) a video camera for capturing a current live video image of a patient;
(b) storage memory for storing digital images, the storage memory containing a first, earlier captured, digital image of the patient;
(c) a monitor for displaying images captured by the video camera and images stored in the storage memory; and
(d) manipulation computer means coupled to the video camera, the storage memory, and the monitor for retrieving, manipulating, and displaying images, the manipulation computer means being programmed to: (i) retrieve the first stored digital image from the storage memory and display the first stored digital image in a fixed position on the monitor; and (ii) overlay the current live video image of the patient on the monitor with the first stored digital image, wherein at least one of the first stored digital image or the current live video image is substantially translucent to allow the relative position of the camera and the patient to be adjusted so that the orientation of the patient in the current live video image is approximately the same as the orientation of the patient in the first stored digital image.

7. The imaging system of claim 6, wherein the manipulation computer means is programmed to capture a second image of the patient and store the second captured image as a second digital image in the storage memory.

8. The imaging system of claim 7, wherein the manipulation computer means is programmed to display the first stored digital image and the second stored digital image side-by-side on the monitor to allow an accurate comparison of the first and second stored digital images.

9. The imaging system of claim 6, wherein the manipulation computer means is programmed to manipulate the first stored digital image and the current video image so that a left half and a right half of each of the images is reflected around a vertical order to interface images in order to interchange the left and right halves of the images, the images being displayed on the monitor thereby representing a mirror image of the patient.

10. An imaging system for use with a video camera that captures a current digital image of a patient and a monitor that displays images, for comparison of the current digital image with an earlier captured, stored digital image of the patient, the imaging system comprising:
(a) computer image storage memory containing a first, earlier captured, stored digital image of a patient; and
(b) manipulation computer means for retrieving, manipulating, and actuating the display of images on the monitor, the manipulation computer means being programmed to:
(i) retrieve the first stored digital image from the storage memory and to display the first stored digital image in a fixed position on the monitor; and
(ii) actuate a display of a current live video image of the patient on the monitor simultaneously with the first stored digital image, with one of the first stored digital image and the current live video image being substantially translucent the second live video image being overlaid on the first stored digital image to allow the current live video image of the video image to be adjusted so that the orientation of the patient in the current live video image is approximately the same as the orientation of the patient in the first stored digital image.

11. In an aesthetic imaging system for use in imaging a patient, a method of simultaneously displaying a plurality of digital images of the patient for comparison thereof, the aesthetic imaging system including a video camera operably coupled to a computer processor, image storage memory containing a first gored image of the patient taken at an earlier time, and a monitor, the method comprising:
(a) positioning the patient in front of the video camera so that a second, current image of the patient is captured by the video camera;
(b) displaying the second, current image of the patient on the monitor;
(c) displaying the first digital image of the patient in a fixed position on the monitor with the second digital image overlaid on the first digital image and with at least one of the first or second digital images being substantially translucent to allow the patient to view the first digital image through the second digital image and to reposition relative to the video camera in order to adjust the relative alignment of the first and second digital images on the display; and
(d) storing the second image of the patient once the first and second digital images are aligned on the display.

* * * * *

UNITED STATES PATENT AND TRADEMARK OFFICE
CERTIFICATE OF CORRECTION

PATENT NO.    : 5,687,259
DATED         : November 11, 1997
INVENTOR(S)   : R.A. Linford It is certified that error appears in the above-indentified patent and that said Letters Patent is hereby corrected as shown below:

| COLUMN | LINE | |
|---|---|---|
| 19 (Claim 9, | 41 line 5) | "order to interface images" should read --axis bisecting the images-- |
| 20 (Claim 10, | 18 line 21) | "of the video image" should read --of the patient-- |
| 20 (Claim 11, | 28 line 6) | "gored" should read --stored-- |

Signed and Sealed this

Twenty-eighth Day of April, 1998

Attest:

BRUCE LEHMAN

Attesting Officer

Commissioner of Patents and Trademarks